United States Patent
Yakumaru et al.

(10) Patent No.: US 11,332,835 B2
(45) Date of Patent: May 17, 2022

(54) HYDROGEN SYSTEM

(71) Applicant: Panasonic Intellectual Property Management Co., Ltd., Osaka (JP)

(72) Inventors: Yuuichi Yakumaru, Nara (JP); Hiroaki Fujii, Nara (JP); Atsushi Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 523 days.

(21) Appl. No.: 16/270,707

(22) Filed: Feb. 8, 2019

(65) Prior Publication Data

US 2019/0276944 A1 Sep. 12, 2019

(30) Foreign Application Priority Data

Mar. 6, 2018 (JP) .............................. JP2018-039474

(51) Int. Cl.
*C25B 15/02* (2021.01)
*C25B 1/04* (2021.01)
(Continued)

(52) U.S. Cl.
CPC ............ *C25B 15/02* (2013.01); *C01B 3/0005* (2013.01); *C01B 3/02* (2013.01); *C01B 3/34* (2013.01);
(Continued)

(58) Field of Classification Search
CPC ........... C25B 1/04; C25B 1/044; C25B 15/02; C01B 3/005; C01B 3/02; C01B 3/34; C01B 2203/0227; Y02E 60/32; Y02E 60/36

See application file for complete search history.

(56) References Cited

U.S. PATENT DOCUMENTS

| 7,275,569 | B2 | 10/2007 | Hobbs | |
| 2003/0148171 | A1* | 8/2003 | Mitlitsky | .......... H01M 8/04059 429/53 |

(Continued)

FOREIGN PATENT DOCUMENTS

| JP | 2014-026873 | 2/2014 |
| JP | 2016-056397 | 4/2016 |
| JP | 2016-094948 | 5/2016 |

OTHER PUBLICATIONS

The Extended European Search Report dated Jul. 29, 2019 for the related European Patent Application No. 19159239.3.

*Primary Examiner* — Ciel P Contreras
(74) *Attorney, Agent, or Firm* — McDermott Will & Emery LLP

(57) ABSTRACT

A hydrogen system includes: a generator which generates hydrogen-containing gas; a storage which stores the hydrogen-containing gas generated by the generator; a first gas passage which connects the generator and the storage; a housing which houses the generator, the storage and the first gas passage; a second gas passage in which the hydrogen-containing gas discharged from the first gas passage to an outside of the housing flows; a first valve provided to the second gas passage; a third gas passage in which the hydrogen-containing gas discharged from the storage to the outside of the housing flows; a second valve provided to the third gas passage; and a controller which opens at least one of the first valve and the second valve.

26 Claims, 21 Drawing Sheets

(51) Int. Cl.
*C01B 3/02* (2006.01)
*C01B 3/34* (2006.01)
*C01B 3/00* (2006.01)

(52) U.S. Cl.
CPC ........ *C25B 1/04* (2013.01); *C01B 2203/0227* (2013.01)

(56) References Cited

U.S. PATENT DOCUMENTS

| | | | |
|---|---|---|---|
| 2003/0226588 A1* | 12/2003 | Olander | F17C 5/00 137/240 |
| 2010/0219066 A1* | 9/2010 | Takeuchi | C25B 1/04 204/242 |
| 2012/0255868 A1* | 10/2012 | Takeuchi | C25B 9/05 205/628 |
| 2016/0068976 A1 | 3/2016 | Yoshida et al. | |
| 2016/0377342 A1* | 12/2016 | Mermelstein | C25B 1/04 62/617 |

* cited by examiner

HYDROGEN SYSTEM

BACKGROUND

1. Technical Field

The present disclosure relates to a hydrogen system.

2. Description of the Related Art

Hydrogen systems have been developed toward the realization of a hydrogen society nowadays. As such hydrogen systems, proposed is a system which includes a hydrogen generator such as a water electrolyzing apparatus, and a hydrogen storage for storing hydrogen generated by the hydrogen generator (see, for example, Japanese Unexamined Patent Application Publication No. 2016-056397 (hereinafter referred to as Patent Document 1)).

In the hydrogen system disclosed in Patent Document 1, the water electrolyzing apparatus and the storage tank are respectively placed inside two chambers into which the interior of the housing is partitioned by an inner wall. A hydrogen sensor, a ventilator and the like are provided in the each chamber, as a measure to prevent hydrogen leakage.

The flammable range of hydrogen is wider than that of fossil fuel such as methane. For this reason, care is needed to handle hydrogen lest anomalies in the hydrogen storage tank lead to hydrogen ignition.

Regarding, for example, a hydrogen storage tank disclosed in Japanese Unexamined Patent Application Publication No. 2016-94948 (hereinafter referred to as Patent Document 2), it is proposed that a port for ventilation between the inside and the outside of the hydrogen storage tank be opened in a case where vibration, heat, temperature or strain on the external shell of the hydrogen storage tank exceeds a predetermined range. Thus, hydrogen in the hydrogen storage tank is discharged to the outside. This makes it possible to reduce risk of hydrogen ignition due to some anomalies in the external shell of the hydrogen storage tank.

SUMMARY

One non-limiting and exemplary embodiment enables hydrogen-containing gas to be discharged from an interior of a housing to an outside of the housing more appropriately than ever.

In one general aspect, the techniques disclosed here feature a hydrogen system including: a generator which generates hydrogen-containing gas; a storage which stores the hydrogen-containing gas generated by the generator; a first gas passage which connects the generator and the storage; a housing which houses the generator, the storage and the first gas passage; a second gas passage in which the hydrogen-containing gas discharged from the first gas passage to an outside of the housing flows; a first valve provided to the second gas passage; a third gas passage in which the hydrogen-containing gas discharged from the storage to the outside of the housing flows; a second valve provided to the third gas passage; and a controller which opens at least one of the first valve and the second valve.

The hydrogen system according to one aspect of the present disclosure brings about an effect of enabling the hydrogen-containing gas from the interior of the housing to the outside of the housing more appropriately than ever.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
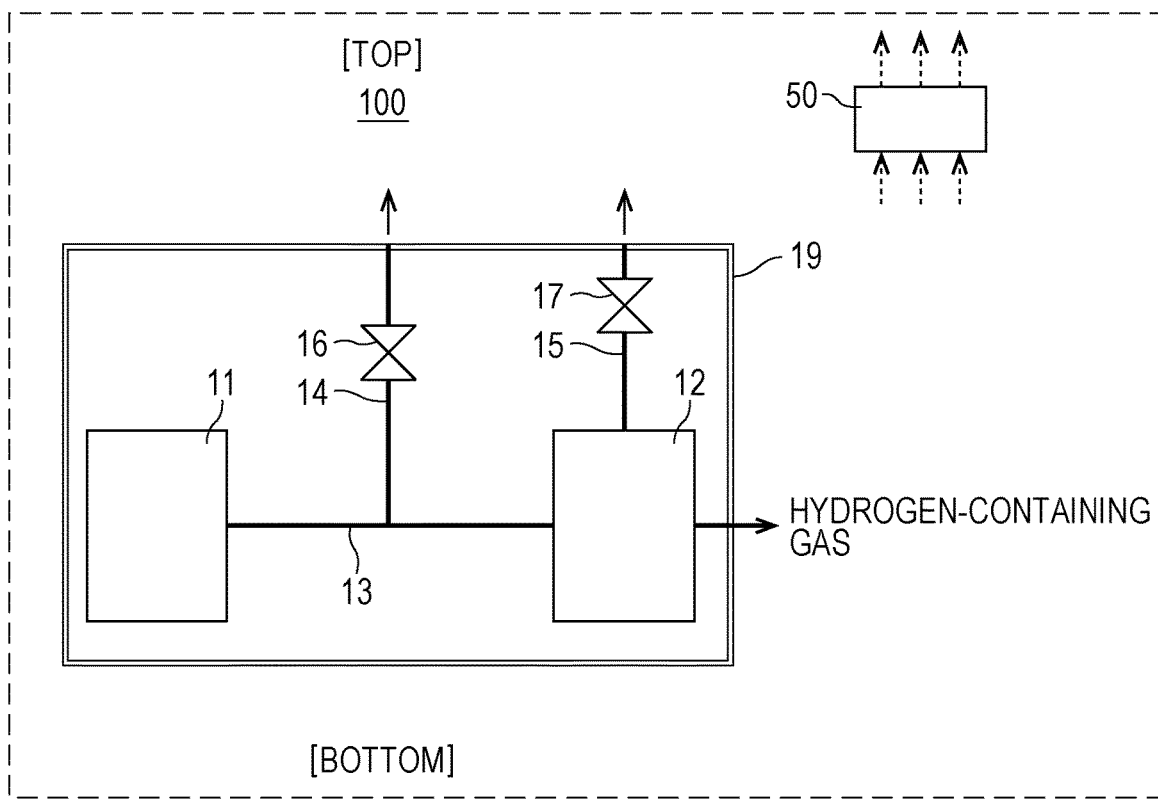
FIG. 1 is a diagram illustrating an example of a hydrogen system according to a first embodiment.

Regarding Patent Document 1, in a case where a hydrogen leakage state occurs in each chamber, hydrogen in the housing is discharged to the outside of the housing by operating fans. Generally speaking, when hydrogen leakage occurs inside the housing, it takes time to make the hydrogen concentration in the housing lower than a flammable range by operating the fans. Thus, when hydrogen leakage occurs, the operator has to wait a long time before starting maintenance.

In view of this, a hydrogen system according to a first aspect of the present disclosure includes: a generator which generates hydrogen-containing gas; a storage which stores the hydrogen-containing gas generated by the generator; a first gas passage which connects the generator and the storage; a housing which houses the generator, the storage and the first gas passage; a second gas passage in which the hydrogen-containing gas discharged from the first gas passage to an outside of the housing flows; a first valve provided to the second gas passage; a third gas passage in which the hydrogen-containing gas discharged from the storage to the outside of the housing flows; a second valve provided to the third gas passage; and a controller which opens at least one of the first valve and the second valve.

This configuration makes it possible for the hydrogen system according to this aspect to discharge the hydrogen-containing gas from the interior of the housing to the outside of the housing more appropriately than ever.

A hydrogen system according to a second aspect of the present disclosure is the hydrogen system according to the first aspect which may further include at least one detector which detects hydrogen leakage inside the housing, wherein when the at least one detector detects the hydrogen leakage, the controller may open at least one of the first valve and the second valve to discharge the hydrogen-containing gas to the outside of the housing.

For example, the controlling of the openings of the first valve and the second valve makes it possible to, depending on the necessity, choose among: the prioritized discharge of the hydrogen-containing gas to the outside of the housing from the first gas passage; the discharge of the hydrogen-containing gas to the outside of the housing from both the first gas passage and the storage; and the prioritized discharge of the hydrogen-containing gas to the outside of the housing from the storage.

In addition, the hydrogen system according to this aspect is capable of solving the hydrogen leakage state more appropriately than ever. Specifically, when hydrogen leakage occurs inside the housing, the hydrogen system according to this aspect discharges the hydrogen-containing gas to the outside of the housing directly from at least one of the second gas passage and the third gas passage, and is thus capable of solving the hydrogen leakage state more quickly than ever.

A hydrogen system according to a third aspect of the present disclosure is the hydrogen system according to the second aspect, wherein when the at least one detector detects the hydrogen leakage, the controller may first open the first valve out of the first valve and the second valve.

This configuration makes it possible for the hydrogen system according to this aspect to first open the first valve out of the first valve and the second valve, and to thereby appropriately control the opening/closing of the second valve based on the detection of the hydrogen leakage after opening the first valve.

A hydrogen system according to a fourth aspect of the present disclosure is the hydrogen system according to the third aspect, wherein if the at least one detector no longer detects the hydrogen leakage within a predetermined time length after the first valve is opened, the controller may not open the second valve.

This configuration makes it possible for the hydrogen system according to this aspect to control the second valve so as not to open the second valve in the case where the hydrogen leakage is no longer detected within the predetermined time length after the first valve is opened, and to thereby inhibit a larger amount of hydrogen-containing gas from being discharged to the outside of the housing in a shorter time length than in a case where the controller opens the first valve and the second valve at the same time.

A hydrogen system according to a fifth aspect of the present disclosure is the hydrogen system according to the third or fourth aspect, wherein if the at least one detector continues detecting the hydrogen leakage beyond the predetermined time length after the first valve is opened, the controller may open the second valve.

In other words, the hydrogen system according to this aspect controls the second valve so as to open the second valve in the case where the at least one detector continues detecting the hydrogen leakage beyond the predetermined time length after the first valve is opened, and thereby discharges the hydrogen-containing gas to the outside of the housing directly from the storage only in a case where the hydrogen leakage continues beyond the predetermined time length. Thereby, the hydrogen system according to this aspect is capable of solving the hydrogen leakage state by opening the second valve after the predetermined time length more quickly than by not opening the second valve.

A hydrogen system according to a sixth aspect of the present disclosure is the hydrogen system according to the first aspect, wherein the controller may open both the first valve and the second valve.

This configuration makes it possible for the hydrogen system according to this aspect to open the first valve and the second valve, and to thereby discharge the hydrogen-containing gas from the interior of the housing to the outside of the housing more appropriately than ever.

A hydrogen system according to a seventh aspect of the present disclosure is the hydrogen system according to the second aspect, wherein when the at least one detector detects the hydrogen leakage, the controller may open both the first valve and the second valve.

This configuration makes it possible for the hydrogen system according to this aspect to solve the hydrogen leakage state more appropriately than ever. Specifically, when the hydrogen leakage occurs inside the housing, the hydrogen system according to this aspect discharges the hydrogen-containing gas to the outside of the housing directly from both the second gas passage and the third gas passage, and is accordingly capable of solving the hydrogen leakage state more quickly than ever.

A hydrogen system according to an eighth aspect of the present disclosure is the hydrogen system according to the first aspect, wherein the controller may open the first valve, and closes the second valve.

This configuration makes it possible for the hydrogen system according to this aspect to open the first valve, and to thereby discharge the hydrogen-containing gas in the interior of the first gas passage to the outside of the housing more appropriately than ever.

A hydrogen system according to a ninth aspect of the present disclosure is the hydrogen system according to the second aspect, wherein when the at least one detector detects the hydrogen leakage, the controller may open the first valve, and closes the second valve.

This configuration makes it possible for the hydrogen system according to this aspect to solve the hydrogen leakage state more appropriately than ever. Specifically, when the hydrogen leakage occurs inside the housing, the hydrogen system according to this aspect discharges the hydrogen-containing gas to the outside of the housing directly from the second gas passage, and is accordingly capable of solving the hydrogen leakage state more quickly than ever.

A hydrogen system according to a tenth aspect of the present disclosure is the hydrogen system according to the first aspect, wherein the controller may close the first valve, and open the second valve.

This configuration makes it possible for the hydrogen system according to this aspect to open the second valve, and to thereby discharge the hydrogen-containing gas in the interior of the storage to the outside of the housing more appropriately than ever.

A hydrogen system according to an eleventh aspect of the present disclosure is the hydrogen system according to the second aspect, wherein when the at least one detector detects the hydrogen leakage, the controller may close the first valve, and open the second valve.

This configuration makes it possible for the hydrogen system according to this aspect to solve the hydrogen leakage state more appropriately than ever. Specifically, when the hydrogen leakage occurs inside the housing, the hydrogen system according to this aspect discharges the hydrogen-containing gas to the outside of the housing directly from the third gas passage, and is accordingly capable of solving the hydrogen leakage state more quickly than ever.

A hydrogen system according to a twelfth aspect of the present disclosure is the hydrogen system according to any one of the first to eleventh aspects, which may further include a third valve provided to the first gas passage downstream of a branch point of the first gas passage from which the second gas passage is branched, wherein the controller may close the third valve while the controller opens the first valve.

Because the second gas passage extends after being branched from the first gas passage, there is likelihood that the hydrogen-containing gas in the interior of the first gas passage leaks to the interior of the housing through a connecting part where the pipe forming the branched passage like this is connected to the first gas passage. In view of this, while the controller opens the first valve, the hydrogen system according to this aspect is capable of reducing the amount of hydrogen-containing gas leaking to the interior of the housing through the connecting part of the pipe by closing the third valve. Incidentally, in this event, if the second valve is kept in the closed state, the hydrogen system according to this aspect is capable of inhibiting the hydrogen-containing gas existing in the storage from being discharged to the outside of the housing by closing the third valve.

A hydrogen system according to a thirteenth aspect of the present disclosure is the hydrogen system according to the twelfth aspect, which may further includes a fourth valve provided to the first gas passage upstream of the branch point from which the second gas passage is branched, wherein the controller may close the third valve, and open the fourth valve while the controller opens the first valve.

Since the second gas passage extends after being branched from the first gas passage, there is likelihood that the hydrogen-containing gas in the interior of the first gas passage leaks to the interior of the housing through the connecting part where the pipe forming the branched passage like this is connected to the first gas passage. In view of this, while the controller opens the first valve, the hydrogen system according to this aspect is capable of reducing the amount of hydrogen-containing gas leaking to the interior of the housing through the connecting part of the pipe by closing the third valve. Incidentally, in this event, if the second valve is kept in the closed state, the hydrogen system according to this aspect is capable of inhibiting the hydrogen-containing gas existing in the storage from being discharged to the outside of the housing by closing the third valve.

A hydrogen system according to a fourteenth aspect of the present disclosure is the hydrogen system according to the twelfth aspect, which may further include a fourth valve provided to the first gas passage upstream of the branch point from which the second gas passage is branched, wherein the controller may close both the third valve and the fourth valve while the controller opens the first valve.

Since the second gas passage extends after being branched from the first gas passage, there is likelihood that the hydrogen-containing gas in the interior of the first gas passage leaks to the interior of the housing through the connecting part where the pipe forming the branched passage like this is connected to the first gas passage. In view of this, while the controller opens the first valve, the hydrogen system according to this aspect is capable of appropriately stopping the leakage of hydrogen to the interior of the housing through the connecting part of the pipe by closing the third valve and the fourth valve. Incidentally, in this event, if the second valve is kept in the closed state, the hydrogen system according to this aspect is capable of inhibiting the hydrogen-containing gas existing in the storage from being discharged to the outside of the housing by closing the third valve.

A hydrogen system according to a fifteenth aspect of the present disclosure is the hydrogen system according to any one of the first to eleventh aspects, which may further include a third valve provided to the first gas passage downstream of a branch point of the first gas passage from which the second gas passage is branched, wherein the controller may close the third valve while the controller opens the second valve.

This configuration makes it possible for the hydrogen system according to this aspect to open the second valve, and to thereby quickly discharge the hydrogen-containing gas to the outside of the housing directly from the third gas passage. In addition, by closing the third valve, for example, an operator can do things, such as performing maintenance work on the storage, quickly and easily.

A hydrogen system according to a sixteenth aspect of the present disclosure is the hydrogen system according to any one of the first to eleventh aspects, which may include: a third valve provided to the first gas passage downstream of a branch point of the first gas passage from which the second gas passage is branched: a fourth valve provided to the first gas passage upstream of the branch point from which the second gas passage is branched; and a first join and a second joint provided to the first gas passage between the third valve and the fourth valve, wherein the second gas passage may be branched from the first gas passage between the first joint and the second joint.

Since the second gas passage extends after being branched from the first gas passage between the first joint and the second joint, there is likelihood that the hydrogen-containing gas in the interior of the first gas passage leaks to the interior of the housing through the first joint and the second joint included in the branched passage like this.

With this taken into consideration, in the hydrogen system according to this aspect, the first joint and the second joint are provided to the first gas passage between the third valve and the fourth valve. This makes it possible for the hydrogen system according to this aspect to appropriately stop the leakage of hydrogen in the interior of the housing through the first valve and the second valve by both opening the first valve and closing the third valve and the fourth valve.

A hydrogen system according to a seventeenth aspect of the present disclosure is the hydrogen system according to the first aspect, wherein: at least one detector may include a first detector which detects hydrogen leakage from the first gas passage, and a second detector which detects hydrogen leakage from the storage; and if the first detector detects the hydrogen leakage but the second detector detects no hydrogen leakage, the controller may open the first valve, and close the second valve.

In a case where the first detector detects the hydrogen leakage but the second detector detects no hydrogen leakage, there is high likelihood that the hydrogen-containing gas leaks to the interior of the housing from the first gas passage. In this case, the hydrogen system according to this aspect is capable of reducing the amount of hydrogen-containing gas discharged to the outside of the housing by opening the first valve and closing the second valve. Specifically, the hydrogen system according to this aspect is capable of inhibiting the hydrogen-containing gas existing in the storage from being discharging to the outside of the housing, for example, by opening the first valve and simultaneously closing an on-off valve provided on the first gas passage between the storage and the branch point of the first gas passage from which the second gas passage is branched. Incidentally, this on-off valve may be the third valve.

A hydrogen system according to an eighteenth aspect of the present disclosure is the hydrogen system according to the first aspect, wherein: at least one detector may include a first detector which detects hydrogen leakage from the first gas passage, and a second detector which detects hydrogen leakage from the storage; and if the second detector detects the hydrogen leakage but the first detector detects no hydrogen leakage, the controller may open the second valve, and close the first valve.

In a case where the second detector detects the hydrogen leakage but the first detector detects no hydrogen leakage, there is high likelihood that the hydrogen-containing gas leaks to the interior of the housing from the storage. In this case, the hydrogen system according to this aspect is capable of reducing the amount of hydrogen-containing gas discharged to the outside of the housing by opening the second valve and closing the first valve. Specifically, the hydrogen system according to this aspect is capable of inhibiting the hydrogen-containing gas existing in the generator from being discharging to the outside of the housing, for example, by opening the second valve and simultaneously closing an on-off valve provided on the first gas passage between the generator and the branch point from which the second gas passage is branched. Incidentally, this on-off valve may be the fourth valve.

A hydrogen system according to a nineteenth aspect of the present disclosure is the hydrogen system according to any one of the first to eighteenth aspects, which may further include a ventilator which ventilates an interior of the housing, wherein when the at least one detector detects hydrogen leakage, the controller may operate the ventilator.

This configuration makes it possible for the hydrogen system according to this aspect to discharge the hydrogen-containing gas in the interior of the housing to the outside of the housing through the operation of the ventilator.

A hydrogen system according to a twentieth aspect of the present disclosure is the hydrogen system according to any one of the first to eighteenth aspects, which may further include a ventilator which ventilates an interior of the housing, wherein when the at least one detector detects hydrogen leakage, the controller may stop generation of the hydrogen-containing gas by the generator, and operate the ventilator.

While the ventilator is being operated in conjunction with the operation of the generator which generates the hydrogen-containing gas, when the operation of the hydrogen system is normally stopped, the operation of the generator is stopped, and the operation of the ventilator is stopped as well. However, as discussed above, when the at least one detector detects hydrogen leakage, the hydrogen system according to this aspect stops the generation of the hydrogen-containing gas by the generator, and continues operating the ventilator. Thereby, after stopping the operation of the generator, the hydrogen system according to this aspect is capable of discharging the hydrogen-containing gas in the interior of the housing to the outside of the housing through the operation of the ventilator.

Meanwhile, regarding Patent Document 1, as discussed above, in a case where hydrogen leakage occurs inside the housing, the operator has to wait a long time before starting recovery work. Furthermore, for example, none of Patent Documents 1 and 2 discuss the role to be played by the pressure booster which boosts the pressure of hydrogen while hydrogen is being discharged from the interior of the housing to the outside of the housing for the maintenance purpose or the like.

A hydrogen system according to a twenty-first aspect of the present disclosure is the hydrogen system according to any one of the first to twentieth aspects, which may include a pressure booster which boosts pressure of the hydrogen-containing gas generated by the generator and supplies the hydrogen-containing gas to the storage, wherein the second gas passage may be branched from a point of the first gas passage downstream of the pressure booster.

This configuration makes it possible for the hydrogen system according to this aspect to appropriately discharge the hydrogen-containing gas in the interior of the generator and the interior of the storage to the outside of the housing, for example, by setting the opened states of the first valve and the second valve as well as the operational state of the pressure booster depending on the necessity.

A hydrogen system according to a twenty-second aspect of the present disclosure is the hydrogen system according to the twenty-first aspect, wherein the controller may operate the pressure booster while the controller opens the first valve.

For example, when the first valve is opened, this configuration makes it possible for the hydrogen system according to this aspect to appropriately discharge the hydrogen-containing gas in the interior of the generator to the outside of the housing via the second gas passage through the pressure boosting operation of the pressure booster. Thereby, the operator can, for example, do things, such as performing maintenance work on the generator, quickly and easily.

A hydrogen system according to a twenty-third aspect of the present disclosure is the hydrogen system according to the fourteenth aspect, which may further include a pressure booster which boosts pressure of the hydrogen-containing gas generated by the generator and supplies the hydrogen-containing gas to the storage, wherein: the second gas passage may be branched from a point of the first gas passage downstream of the pressure booster; and the controller may not operate the pressure booster while the controller opens the first valve and closes the third valve and the fourth valve.

Because of this configuration, the hydrogen system according to this aspect does not operate the pressure booster provided between the generator and the fourth valve when closing the third valve, although the controller opens the first valve. This makes it possible for the hydrogen system according to this aspect to reduce risk of damage to the pressure booster. This also makes it possible for the hydrogen system according to this aspect to reduce the amount of electric power needed to operate the pressure booster.

The discharge of hydrogen for maintenance on the hydrogen system has been earnestly studied, and the following findings are obtained. For example, when maintenance is performed on the hydrogen generator in the hydrogen system, there is a case where no maintenance need be performed on the hydrogen storage therein. In this case, if the hydrogen-containing gas in the interior of the hydrogen storage in the hydrogen system is discharged to the outside of the system, there is likelihood that loss occurs due to the discharge of hydrogen from the interior of the hydrogen storage.

A hydrogen system according to a twenty-fourth aspect of the present disclosure is the hydrogen system according to the first to twenty-third aspects, which may further include: a third valve provided to the first gas passage downstream of a branch point of the first gas passage from which the second gas passage is branched; and a receiver which receives an input from an outside, wherein based on the input received by the receiver, the controller may perform one of a first mode of opening the first valve and the second valve, and a second mode of closing the second valve and the third valve and opening the first valve.

This configuration makes it possible for the hydrogen system according to this aspect to discharge hydrogen for the maintenance purpose more appropriately than ever.

For example, when maintenance is performed on the generator in the hydrogen system according to this aspect, the hydrogen system causes the controller to perform the second mode of closing the second valve and the third valve and opening the first valve based on the input received by the receiver. Thereby, the hydrogen system disrupts the communication of the interior of the storage with the outside of the housing by the second valve and the third valve, and thereby does not discharge the hydrogen-containing gas in the interior of the storage to the outside of the housing.

Thus, the hydrogen system according to this aspect is capable of keeping the hydrogen-containing gas in the interior of the storage staying therein in the case where no maintenance need be performed on the storage, when maintenance is performed on the generator in the hydrogen system.

A hydrogen system according to a twenty-fifth aspect of the present disclosure is the hydrogen system according to the twenty-fourth aspect, which may further include a pressure booster which boosts pressure of the hydrogen-containing gas generated by the generator and supplies the hydrogen-containing gas to the storage, wherein: the second gas passage may be branched from a point of the first gas passage downstream of the pressure booster; and the controller may operate the pressure booster in the first mode and the second mode.

This configuration makes it possible for the hydrogen system according to this aspect to appropriately discharge the hydrogen-containing gas in the interior the generator to the outside of the housing through the pressure boosting operation of the pressure booster in the first mode and the second mode.

A hydrogen system according to a twenty-sixth aspect of the present disclosure is the hydrogen system according to the twenty-fourth aspect, wherein based on the input received by the receiver, the controller may perform one of the first mode, the second mode, and a third mode of closing the first valve and the third valve and opening the second valve.

When the operator performs maintenance on either or both of the generator and the storage, this configuration makes it possible for the hydrogen system according to this aspect to put the interior of the generator and/or the interior of the storage into a state of being able to discharge hydrogen to the outside of the housing by the controller's performing one of the first mode, the second mode and the third mode based on the input received by the receiver. This makes it possible for the operator to perform the maintenance on the generator and/or the storage without difficulty.

Specifically, when maintenance is performed on both the generator and the storage, the first mode is performed to make the interior of the generator and the interior of the storage communicate with the outside of the housing. This makes it possible to discharge the hydrogen-containing gas in the interior of the generator and the interior of the storage to the outside of the housing.

When maintenance is performed on the generator, the second mode is performed to disrupt the communication of the interior of the storage with the outside of the housing by the second valve and the third valve, and to make the interior of the generator communicate with the outside of the housing. This makes it possible to discharge the hydrogen-containing gas in the interior of the generator to the outside of the housing.

When maintenance is performed on the storage, the third mode is performed to disrupt the communication of the interior of the generator with the outside of the housing by the first valve and the third valve, and to make the interior of the storage communicate with the outside of the housing. This makes it possible to discharge the hydrogen-containing gas in the interior of the storage to the outside of the housing.

A hydrogen system according to a twenty-seventh aspect of the present disclosure is the hydrogen system according to the twenty-sixth aspect, which may further include a pressure booster which boosts pressure of the hydrogen-containing gas generated by the generator and supplies the hydrogen-containing gas to the storage, wherein: the second gas passage may be branched from a point of the first gas passage downstream of the pressure booster; and the controller may operate the pressure booster in the first mode and the second mode, and may not operate the pressure booster in the third mode.

This configuration makes it possible for the hydrogen system according to this aspect to appropriately discharge the hydrogen-containing gas in the interior of the generator to the outside of the housing through the pressure boosting operation of the pressure booster in the first mode and the second mode.

In many cases, the hydrogen-containing gas in high pressure state is stored in the storage. In these cases, in the third mode, by opening the second valve with the first valve and the third valve kept in the closed state, the hydrogen system according to this aspect is capable of appropriately discharging the hydrogen-containing gas in the interior of the storage to the outside of the housing using the gas pressure in the interior of the storage. Thus, in the third mode, the hydrogen system according to this aspect is capable of reducing the amount of electric power needed to operate the pressure booster, by not operating the pressure booster. Furthermore, in the third mode, the hydrogen system according to this aspect is capable of reducing risk of damage to the pressure booster, provided among the generator, the first valve and the third valve, by not operating the pressure booster when closing the first valve and the third valve.

Referring to the accompanying drawings, descriptions will be hereinafter provided for the embodiments in the present disclosure. Incidentally, the embodiments discussed below just represent examples of the foregoing aspects. For this reason, shapes, materials, components, as well as places where to arrange the components, ways in which to connect the components, and the like, which will be discussed below, are merely their examples, and do not limit the above-discussed aspects unless described in the claims. Of the following components, those not described in independent claims discussing the most generic concepts of the above aspects will be explained as arbitrary components. Furthermore, descriptions for components denoted by the same reference sings in the drawings will be omitted whenever deemed appropriate. The drawings schematically illustrate the components for the purpose of facilitating understanding, and shapes, dimensional ratios and the like are not necessarily accurately represented.

Things such as the order of the steps for making the hydrogen systems work may be changed depending on the necessity. Furthermore, other publicly-known steps may be added depending on the necessity.

First Embodiment

[System Configuration]

FIG. 1 is a diagram illustrating an example of a hydrogen system according to a first embodiment.

In FIG. 1, "top" and "bottom" are defined as indicated in the drawing, and it is assumed that gravity works from the top to the bottom (this is the case with the other drawings).

In the example illustrated in FIG. 1, the hydrogen system 100 includes a generator 11, a storage 12, a first gas passage 13, a second gas passage 14, a third gas passage 15, a first valve 16, a second valve 17, a housing 19, and a controller 50.

The generator 11 is an apparatus for generating a hydrogen-containing gas. The generator 11 may have any configuration as long as the configuration makes it possible for the generator 11 to generate the hydrogen-containing gas. Examples of the hydrogen-containing gas include: reformed gas produced from methane gas or the like by a reforming reaction; and water vapor-containing hydrogen gas produced by electrolyzing water.

The generator 11 may be, for example, a water electrolyzing apparatus for producing the hydrogen-containing gas by electrolyzing water, but is not limited to this. The water electrolyzing apparatus may be configured to generate the hydrogen-containing gas, for example, using electric power which is generated by regenerative energy such as solar energy. Furthermore, the water electrolyzing apparatus may be configured to perform any type of water electrolyzing method. Examples of the water electrolyzing method include alkaline water electrolysis, solid polymer type water electrolysis, and solid oxide type water electrolysis.

Although their illustration is omitted, devices needed for the water electrolyzing apparatus to generate the hydrogen-containing gas may be provided depending on the necessity. For example, a water pump for supplying water to the water electrolyzing apparatus, and electrolyte membranes for transmitting protons which are generated by water electrolysis may be provided. Furthermore, catalyst layers may be provided to the main surfaces of the electrolyte membranes, respectively. Moreover, a voltage applier for applying voltage between the catalyst layers may be provided.

The storage 12 is an apparatus in which to store the hydrogen-containing gas which is generated by the generator 11. The storage 12 may have any configuration as long as the configuration makes it possible for the storage 12 to store the hydrogen-containing gas which is generated by the generator 11. The storage 12 may be, for example, a tank, but is not limited to this.

The first gas passage 13 is a passage connecting the generator 11 and the storage 12. Specifically, the hydrogen-containing gas discharged from the generator 11 and flowing into the storage 12 flows in the first gas passage 13. Thereby, the hydrogen-containing gas generated by the generator 11 is temporarily stored in the storage 12.

The housing 19 is a container for houses the generator 11, the storage 12 and the first gas passage 13. In this example, as illustrated in FIG. 1, no inner wall (partition wall) for partitioning the interior of the housing 19 into spaces in which the generator 11 and the storage 12 are respectively placed is provided inside the housing 19.

The second gas passage 14 is a passage in which the hydrogen-containing gas discharged from the first gas passage 13 to the outside of the housing 19 flows. In this example, the second gas passage 14 is branched from the first gas passage 13, and extends to the housing 19. In this example, a downstream end of the second gas passage 14 is connected to an upper surface of the housing 19. However, a surface to which to connect the downstream end of the second gas passage 14 is not limited to the upper surface of the housing 19. The downstream end of the second gas passage 14 may be connected, for example, to a side surface of the housing 19.

The first valve 16 is a valve provided to the second gas passage 14. The first valve 16 may be, for example, a solenoid valve, but is not limited to this.

The third gas passage 15 is a passage in which the hydrogen-containing gas discharged from the storage 12 to the outside of the housing 19 flows. In this example, the third gas passage 15 extends from the storage 12 to the housing 19. In this example, a downstream end of the third gas passage 15 is connected to the upper surface of the housing 19. However, a surface to which to connect the downstream end of the third gas passage 15 is not limited to the upper surface of the housing 19. The downstream end of the third gas passage 15 may be connected, for example, to a side surface of the housing 19.

The storage 12 is provided with a hydrogen supplying passage in which the hydrogen-containing gas discharged from the storage 12 and flowing into a hydrogen-using apparatus (not illustrated) flows. In other words, the hydrogen-containing gas stored in the storage 12 is supplied to the hydrogen-using apparatus via the hydrogen supplying passage. To this end, the hydrogen supplying passage extends from the interior of the housing 19 to the hydrogen-using apparatus by passing through a wall portion of the housing 19.

An example of the hydrogen-using apparatus is a fuel cell for generating electric power using hydrogen as fuel. The hydrogen system 100 may include the hydrogen-using apparatus, although its illustration is omitted, inside the housing 19.

The second valve 17 is a valve provided to the third gas passage 15. The second valve 17 may be, for example, a solenoid valve, but is not limited to this.

The controller 50 opens at least one of the first valve 16 and the second valve 17. For example, in a case where the hydrogen-containing gas needs to be discharged to the outside of the housing 19 from within an area of the hydrogen system 100 in which the hydrogen-containing gas exists, at least one of the first valve 16 and the second valve 17 is opened. In this event, the operation of the generator 11 may be stopped. Thereafter, of the first and second valves 16, 17, the valve(s) opened in the above process is opened, and the operation of the hydrogen system 100 may be resumed at appropriate time.

The controller 50 may have any configuration as long as the configuration enables the controller 50 to perform the control functions. The controller 50 includes, for example, an arithmetic circuit (not illustrated) and a storage circuit (not illustrated) for storing the control program. Examples of the arithmetic circuit include an MPU and a CPU. An example of the storage circuit is a memory. The controller 50 may be made up of a signal controller which performs centralized control, or multiple controllers which perform decentralized control in cooperation.

As discussed above, the hydrogen system 100 according to the embodiment is capable of discharging the hydrogen-containing gas from the interior of the housing to the outside of the housing more appropriately than ever.

For example, the controlling of the opening of the first valve 16 and the second valve 17 makes it possible to appropriately choose among the prioritized discharge of the hydrogen-containing gas from the first gas passage 13 to the outside of the housing 19, the discharge of the hydrogen-containing gas from both the first gas passage 13 and the storage 12 to the outside of the housing 19, and the prioritized discharge of the hydrogen-containing gas from the storage 12 to the outside of the housing 19.

First Example

Figure 2:
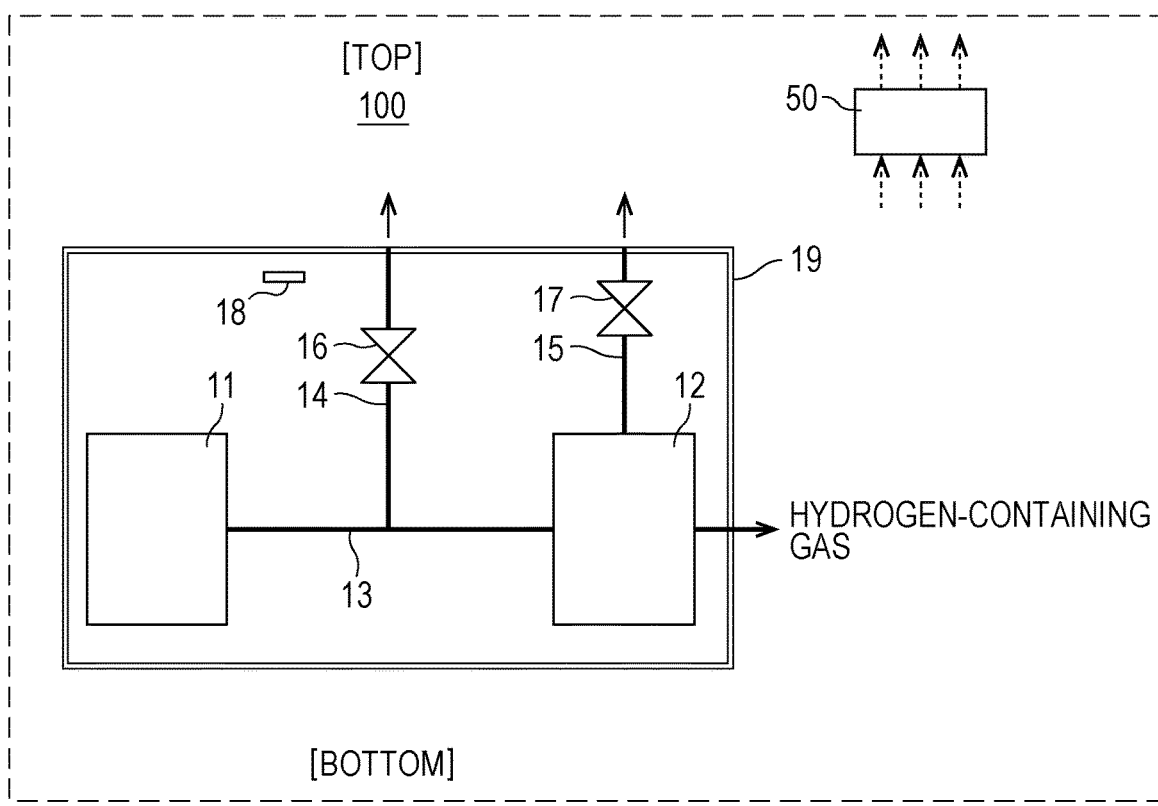
FIG. 2 is a diagram illustrating an example of a hydrogen system according to a first example of the first embodiment.

FIG. 2 is a diagram illustrating an example of a hydrogen system according to a first example of the first embodiment.

In an example illustrated in FIG. 2, the hydrogen system 100 includes a generator 11, a storage 12, a first gas passage 13, a second gas passage 14, a third gas passage 15, a first valve 16, a second valve 17, a detector 18, a housing 19, and a controller 50.

The generator 11, the storage 12, the first gas passage 13, the second gas passage 14, the third gas passage 15, the first valve 16, the second valve 17, and the housing 19 are the same as those in the first embodiment, and descriptions for them will be omitted.

The detector 18 is a sensor for detecting hydrogen leakage inside the housing 19. The detector 18 is provided inside the housing 19. The number of detectors 18 may be one or more. In this example, a single detector 18 is provided inside the housing 19. A configuration in which two detectors 18 are provided inside the housing 19 will be described in an eighth embodiment.

The detector 18 may be a sensor for detecting hydrogen existing inside the housing 19. In this case, the detector 18 may have any configuration as long as the configuration makes it possible for the detector 18 to detect hydrogen inside the housing 19. An example of the detector 18 is a contact combustion-type hydrogen sensor which includes a metal porous sintered body containing oxidation catalyst. The detector 18 is not limited to the hydrogen sensor, and may be any type of sensor as long as the detector 18 is capable of detecting hydrogen which leaks inside the housing 19. For example, because the gas pressure in the passages in the housing 19 where the hydrogen-containing gas exists changes when hydrogen leakage occurs inside the housing 19, pressure gauges (not illustrated), if provided to the passages, may be used as the detector 18. In other words, the detector 18 may be a sensor for, like the pressure gauge, indirectly detecting hydrogen which leaks inside the housing 19. There is a case where a strain gauge, if provided on the container surface of the storage 12, may be used instead of the pressure gauge like this, and detailed descriptions will be provided later.

Referring to the drawing, descriptions will be hereinafter for an example of how the hydrogen system 100 according to this example works.

The following working may be performed by the reading of the control program by the arithmetic circuit of the controller 50 from the storage circuit of the controller 50. However, all the following working does not have to be performed by the controller 50, and an operator may perform part of the working.

Figure 3:
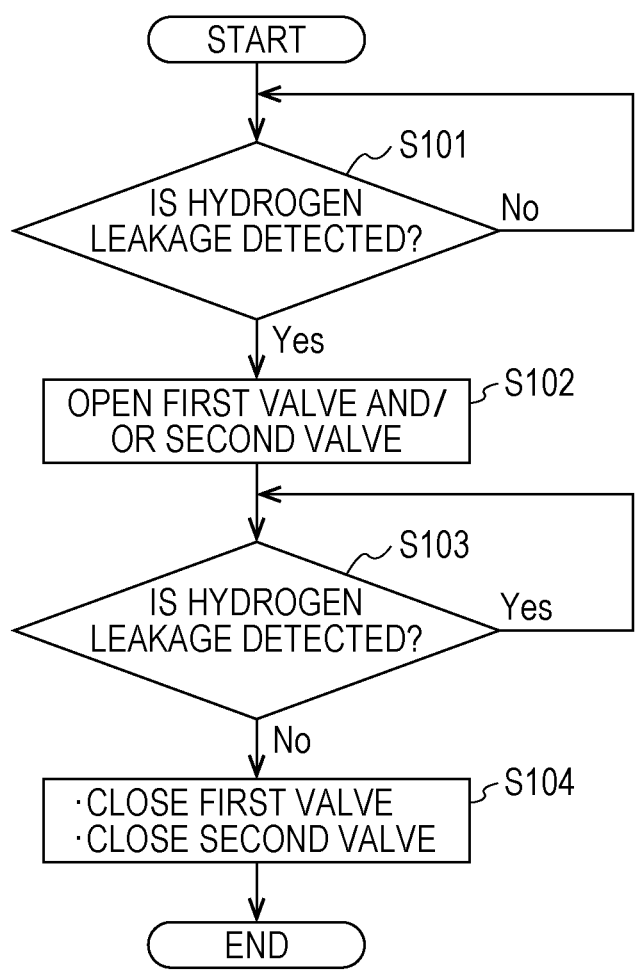
FIG. 3 is a flowchart illustrating an example of how the hydrogen system according to the first example of the first embodiment works.

FIG. 3 is a flowchart illustrating an example of how the hydrogen system according to the first example of the first embodiment works.

While the hydrogen system 100 is in operation, the first valve 16 and the second valve 17 are closed. While the hydrogen system 100 is in operation, the hydrogen-containing gas generated by the generator 11 is supplied to the storage 12 via the first gas passage 13, and is temporarily stored in the storage 12.

The hydrogen-containing gas stored in the storage 12 is supplied to the hydrogen-using apparatus via the hydrogen supplying passage at appropriate time. Thereby, the hydrogen-using apparatus uses hydrogen in the hydrogen-containing gas. For example, in the case where the hydrogen-using apparatus is a fuel cell, the hydrogen in the hydrogen-containing gas supplied from the storage 12 is used as fuel of the fuel cell, and the fuel cell generates electricity.

While this state continues, it is determined in step S101 whether the detector 18 detects hydrogen leakage.

If the detector 18 detects no hydrogen leakage (if No in step S101), the state is kept as it is.

If the detector 18 detects hydrogen leakage (if Yes in step S101), at least one of the first valve 16 and the second valve 17 is opened in step S102. In this event, the operation of the generator 11 may be stopped.

When, for example, the first valve 16 is thus opened, the hydrogen-containing gas is discharged from the first gas passage 13 to the outside of the housing 19 via the second gas passage 14. Otherwise, when the second valve 17 is opened, the hydrogen-containing gas is discharged from the storage 12 to the outside of the housing 19 via the third gas passage 15.

The detector 18 used in step S101 may be a hydrogen sensor provided inside the housing 19, or a pressure gauge provided in the passages in the housing 19 where the hydrogen-containing gas exists.

In the case where the detector 18 is the hydrogen sensor, it can be determined that the leakage of hydrogen into the housing 19 is detected when the concentration of hydrogen in the air inside the housing 19 falls into a hydrogen concentration range which is detectable by the hydrogen sensor.

In the case where the detector 18 is the pressure gauge, it can be indirectly determined that the leakage of hydrogen into the housing 19 is detected when the pressure detected by the pressure gauge drops by a predetermined value or more.

Thereafter, it is determined in step S103 whether the detector 18 detects hydrogen leakage.

If the detector 18 detects the hydrogen leakage (if Yes in step S103), the state is kept as it is.

If the detector 18 no longer detects any hydrogen leakage (if No in step S103), the first valve 16 and the second valve 17 are closed in step S104. For example, in the case only the first valve 16 is opened in step S102, the opened/closed state of the first valve 16 is switched from the opened state to the closed state and the opened/closed state of the second valve 17 is kept in the closed state in step S104. Thereafter, the operation of the hydrogen system 100 may be resumed at appropriate time.

The detector 18 used in step S103 may be the hydrogen sensor provided inside the housing 19, or the pressure gauge provided in the passages in the housing 19 where the hydrogen-containing gas exists.

In the case where the detector 18 is the pressure gauge, it is determined in step S103 that no hydrogen leakage is detected when the flowing of the hydrogen-containing gas out of the passages stops.

In the case where the detector 18 is the hydrogen sensor, it is determined that the leakage of hydrogen into the housing 19 is no longer detected when the concentration of hydrogen in the air inside the housing 19 goes out of the above-mentioned hydrogen concentration range to the outside of the range. In this case, after the flow of the hydrogen-containing gas out of the passages stops, a ventilator (not illustrated) lets fresh air come into the housing 19, and the concentration of hydrogen in the air inside the housing 19 thus goes to the outside of the hydrogen concentration range. For this reason, the hydrogen sensor may cause a longer time lag than the pressure gauge in the determination in step S103 between when the flowing of the hydrogen-containing gas out of the passages stops and when it is determined that the hydrogen leakage is no longer detected.

In the case where the detector 18 is the pressure gauge, it is indirectly determined that the leakage of hydrogen into the housing 19 is no longer detected when a pressure P detected by the pressure gauge reaches a predetermined pressure Pm. For example, the predetermined pressure Pm may be set at atmospheric pressure (for example, 0.1 MPa). In other words, when the pressure P becomes equal to the atmospheric pressure, it may be determined that the leakage of the hydrogen-containing gas due to pressure difference between the spatial pressure (atmospheric pressure) inside the housing 19 and the pressure inside the area in the housing 19 where the hydrogen-containing gas exists (hereinafter referred to as a pressured difference) no longer occurs. In this respect, the predetermined pressure Pm is cited as an example, and is not limited to this example.

While the hydrogen system 100 is in operation, the storage 12 are often filled with the hydrogen-containing gas in a high-pressure state. In this case, an amount of strain of the container surface of the storage 12 due to the pressure of the hydrogen-containing gas correlates with the pressure P detected by the pressure gauge. For this reason, the determination of whether the pressure P reaches the predetermined pressure Pm can be also estimated based on the amount of strain detected by a strain gauge provided on the container surface of the storage 12.

As discussed above, the hydrogen system 100 according to the first example is capable of solving the hydrogen leakage state more appropriately than ever. Specifically, when the hydrogen leakage occurs inside the housing 19, the hydrogen system 100 according to the embodiment directly discharges the hydrogen-containing gas to the outside of the housing 19 via at least one of the second gas passage 14 and the third gas passage 15. The hydrogen system 100 is accordingly capable of solving the hydrogen leakage state more quickly than ever.

The hydrogen system 100 according to the first example may be the same as the hydrogen system 100 according to the first embodiment, except for the above features.

Second Example

A hydrogen system 100 according to a second example is the same as the hydrogen system 100 according to the first example of the first embodiment, except for the following points involved in control by the controller 50.

When the detector 18 detects hydrogen leakage, the controller 50 opens the first valve 16 and the second valve 17. If the detector 18 no longer detects the hydrogen leakage within a predetermined time length Tm after the opening of the first valve 16 and the second valve 17, the controller 50 closes the first valve 16 and the second valve 17.

Referring to the drawings, detailed descriptions will be hereinafter provided for an example of how the hydrogen system 100 according to the second example works.

Figure 4:
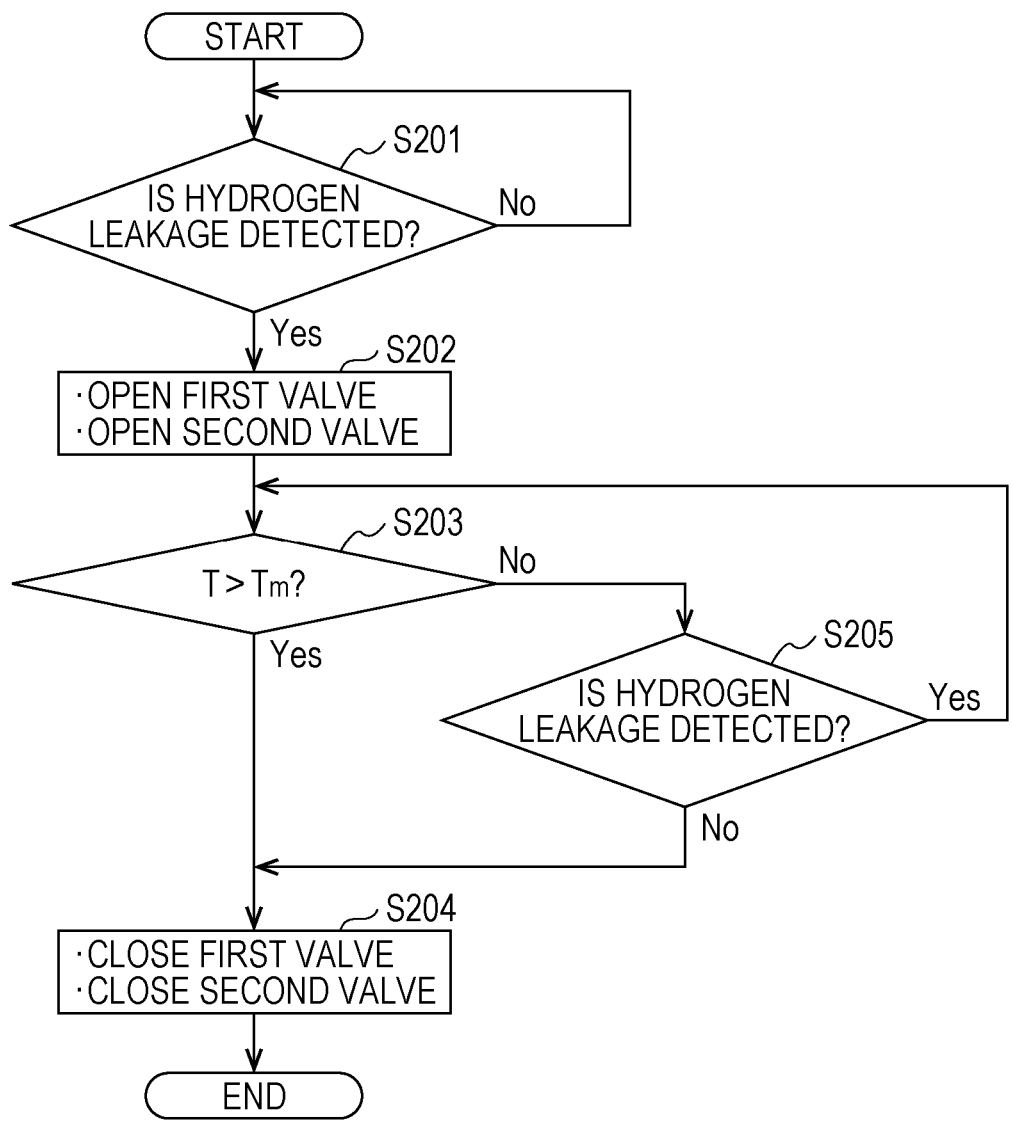
FIG. 4 is a flowchart illustrating an example of how a hydrogen system according to a second example of the first embodiment works.

FIG. 4 is a flowchart illustrating the example of how the hydrogen system according to the second example of the first embodiment works.

The following working may be performed by the reading of the control program by the arithmetic circuit of the controller 50 from the storage circuit of the controller 50. However, all the following working does not have to be performed by the controller 50, and an operator may perform part of the working.

While the hydrogen system 100 is in operation, the first valve 16 and the second valve 17 are closed. While the hydrogen system 100 is in operation, the hydrogen-containing gas generated by the generator 11 is supplied to the storage 12 via the first gas passage 13, and is temporarily stored in the storage 12.

The hydrogen-containing gas stored in the storage 12 is supplied to the hydrogen-using apparatus via the hydrogen supplying passage at appropriate time. Thereby, the hydrogen-using apparatus uses hydrogen in the hydrogen-containing gas.

While this state continues, it is determined in step S201 whether the detector 18 detects hydrogen leakage.

If the detector 18 detects no hydrogen leakage (if No in step S201), the state is kept as it is.

If the detector 18 detects hydrogen leakage (if Yes in step S201), the first valve 16 and the second valve 17 are opened in step S202. In this event, the operation of the generator 11 may be stopped.

Thus, the hydrogen-containing gas is discharged from the first gas passage 13 to the outside of the housing 19 via the second gas passage 14, while the hydrogen-containing gas is discharged from the storage 12 to the outside of the housing 19 via the third gas passage 15.

The detector 18 used in step S201 may be a hydrogen sensor provided inside the housing 19, or a pressure gauge provided in the passages in the housing 19 where the hydrogen-containing gas exists, as in the case of step S101. For this reason, detailed descriptions for how the detector 18 detects hydrogen will be omitted.

Thereafter, in step S203, it is determined whether a time length T after the opening of the first valve 16 and the second valve 17 has exceeded a predetermined time length Tm.

If the time length T has exceeded the predetermined time length Tm (if Yes in step S203), the first valve 16 and the second valve 17 are closed in step S204. The predetermined time length Tm may be set at a time length long enough for the pressure difference to reach a level at which no leakage of the hydrogen-containing gas into the housing 19 occurs after the opening of the first valve 16 and the second valve 17. The predetermined time length Tm may be, for example, approximately 30 minutes, but is not limited to this.

On the other hand, if the time length T has not exceeded the predetermined time length Tm yet (if No in step S203), the controller 50 proceeds to step S205. In step S205, it is determined whether the detector 18 detects hydrogen leakage.

If the detector 18 detects hydrogen leakage (if Yes in step S205), the controller 50 returns to step S203, and repeats the determination in step S203.

If the detector 18 no longer detects hydrogen leakage (if No in step S205), the first valve 16 and the second valve 17 are closed in step S204. Thereafter, the operation of the hydrogen system 100 may be resumed at appropriate time.

The detector 18 used in step S205 may be a hydrogen sensor provided inside the housing 19, or a pressure gauge provided in the passages in the housing 19 where the hydrogen-containing gas exists, as in the case of step S103. For this reason, detailed descriptions for how the detector 18 detects hydrogen will be omitted.

As discussed above, the hydrogen system 100 according to the second example discharges the hydrogen-containing gas directly to the outside of the housing 19 via the second gas passage 14 and the third gas passage 15 by opening the first valve 16 and the second valve 17, and is accordingly capable of solving the hydrogen leakage state more quickly than ever.

Even before the time length T after the opening of the first valve 16 and the second valve 17 has exceeded the predetermined time length Tm, the hydrogen system 100 according to the second example determines in step S205 whether the detector 18 detects hydrogen leakage, and is accordingly capable of quickly checking whether the hydrogen leakage state in the housing 19 can be solved. In a case where the hydrogen leakage in the housing 19 need not be checked before the time length T after the opening of the first valve 16 and the second valve 17 has exceeded the predetermined time length Tm, step S205 may be omitted.

The hydrogen system 100 according to the second example may be the same as the hydrogen system 100 according to any one of the first embodiment and the first example of the first embodiment, except for the above features.

Third Example

A hydrogen system 100 according to a third example is the same as the hydrogen system 100 according to the first example of the first embodiment, except for the following points involved in control by the controller 50.

When the detector 18 detects hydrogen leakage, the controller 50 first opens the first valve 16 out of the first valve 16 and the second valve 17. If the detector 18 no longer detects the hydrogen leakage within the predetermined time length Tm after the opening of the first valve 16, the controller 50 does not open the second valve 17. To put it in the other way, in a case where the detector 18 continues detecting the hydrogen leakage after the predetermined time length Tm has passed since the opening of the first valve 16, the controller 50 opens the second valve 17.

Referring to the drawings, detailed descriptions will be hereinafter provided for an example of how the hydrogen system 100 according to the third example works.

Figure 5:
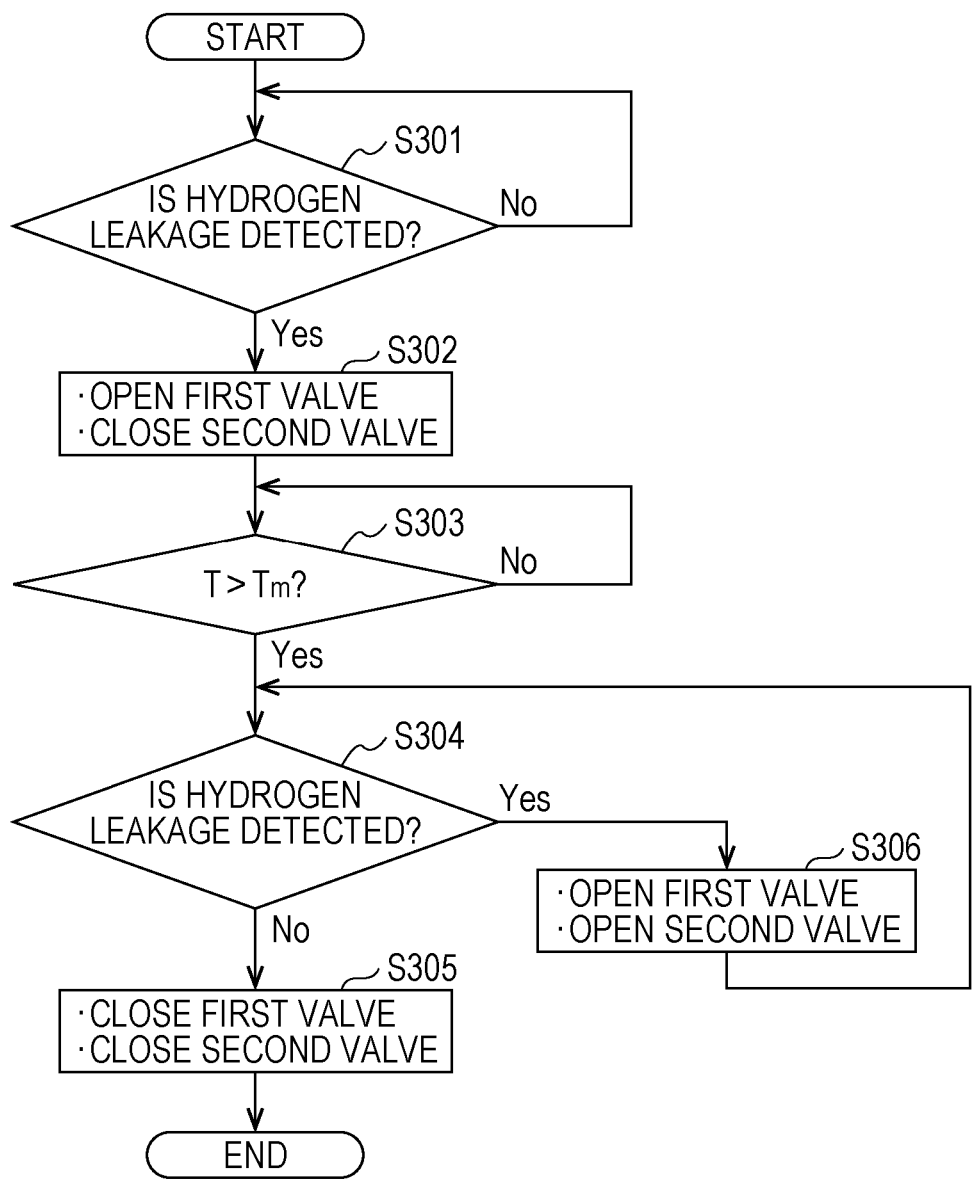
FIG. 5 is a flowchart illustrating an example of how a hydrogen system according to a third example of the first embodiment works.

FIG. 5 is a flowchart illustrating the example of how the hydrogen system according to the third example of the first embodiment works.

The following working may be performed by the reading of the control program by the arithmetic circuit of the controller 50 from the storage circuit of the controller 50. However, all the following working does not have to be performed by the controller 50, and an operator may perform part of the working.

While the hydrogen system 100 is in operation, the first valve 16 and the second valve 17 are closed. While the hydrogen system 100 is in operation, the hydrogen-containing gas generated by the generator 11 is supplied to the storage 12 via the first gas passage 13, and is temporarily stored in the storage 12.

The hydrogen-containing gas stored in the storage 12 is supplied to the hydrogen-using apparatus via the hydrogen supplying passage at appropriate time. Thereby, the hydrogen-using apparatus uses hydrogen in the hydrogen-containing gas.

While this state continues, it is determined in step S301 whether the detector 18 detects hydrogen leakage.

If the detector 18 detects no hydrogen leakage (if No in step S301), the state is kept as it is.

If the detector 18 detects hydrogen leakage (if Yes in step S301), the first valve 16 is opened and the opened/closed state of the second valve 17 is kept in the closed state in step S302. In this event, the operation of the generator 11 may be stopped.

Thereby, the hydrogen-containing gas is discharged from the first gas passage 13 to the outside of the housing 19 via the second gas passage 14.

The detector 18 used in step S301 may be a hydrogen sensor provided inside the housing 19, or a pressure gauge provided in the passages in the housing 19 where the hydrogen-containing gas exists, as in the case of step S101. For this reason, detailed descriptions for how the detector 18 detects hydrogen will be omitted.

Thereafter, in step S303, it is determined whether the time length T after the opening of the first valve 16 has exceeded the predetermined time length Tm.

If the time length T has not exceeded the predetermined time length Tm (if No in step S303), the state is kept as it is in the example, but is not limited to this. For example, if the time length T has not exceeded the predetermined time length Tm (if No in step S303), a determination step which is the same as that in step S205 in FIG. 4 may be performed, although the illustration is omitted. In this case, if the detector 18 no longer detects the hydrogen leakage within the predetermined time length Tm after the opening of the first valve 16, the second valve 17 is not opened. In other words, the opened/closed state of the second valve 17 is kept in the closed state.

The predetermined time length Tm may be set at a time length long enough for the pressure difference to reach a level at which no leakage of the hydrogen-containing gas into the housing 19 occurs after the opening of the first valve 16. The predetermined time length Tm may be, for example, approximately 30 minutes, but is not limited to this.

If the time length T has exceeded the predetermined time length Tm (if Yes in step S303), the controller 50 proceeds to step S304. In step S304, it is determined whether the detector 18 detects hydrogen leakage.

If the detector 18 detects hydrogen leakage (if Yes in step S304), the second valve 17 is opened and the opened/closed state of the first valve 16 is kept in the opened state in step S306. Thereafter, the controller 50 returned to step S304, where it is determined whether the detector 18 detects hydrogen leakage.

On the other hand, if the detector 18 no longer detects hydrogen leakage (if No in step S304), the first valve 16 and the second valve 17 are closed in step S305. For example, if the second valve 17 is opened in step S306, the opened/closed states of the first valve 16 and the second valve 17 are each switched from the opened state to the closed state in step S305. Otherwise, if the second valve 17 is not opened in step S306, the opened/closed state of the first valve 16 is switched from the opened state to the closed state and the opened/closed state of the second valve 17 is kept in the closed state in step S305. Thereafter, the operation of the hydrogen system 100 may be resumed at appropriate time.

As discussed above, the hydrogen system 100 according to the third example first opens the first valve 16 out of the first valve 16 and the second valve 17, and is accordingly capable of appropriately controlling the opening/closing of the second valve 17 based on the detection of the hydrogen leakage after the opening of the first valve 16.

Specifically, the hydrogen system 100 according to the third example controls the second valve 17 so as not to open the second valve 17 if the hydrogen leakage is no longer detected within the predetermined time length Tm after the opening of the first valve 16, and is accordingly capable of controlling the discharging in a shorter time length of a large amount of hydrogen-containing gas to the outside of the housing 19 than in the case where the hydrogen system 100 opens the first valve 16 and the second valve 17 at the same time.

The hydrogen system 100 according to the third example also controls the second valve 17 so as to open the second valve 17 if the detector 18 continues detecting the hydrogen leakage after the predetermined time length Tm has passed since the opening of the first valve 16. Thereby, the hydrogen system 100 according to the third example discharges the hydrogen-containing gas to the outside of the housing 19 directly from the storage 12 only if the hydrogen leakage state continues after the elapse of the predetermined time length Tm. Thus, the hydrogen system 100 according to the third example opens the second valve 17 after the elapse of the predetermined time length Tm, and is accordingly capable of solving the hydrogen leakage state more quickly than in a case where the hydrogen system 100 does not open the second valve 17.

The hydrogen system 100 according to the third example may be the same as the hydrogen system 100 according to any one of the first embodiment and the first to second examples of the first embodiment, except for the above features.

Second Embodiment

A hydrogen system 100 according to a second embodiment is the same as the hydrogen system 100 according to the first embodiment, except for the following points involved in control by the controller 50.

The controller 50 opens both the first valve 16 and the second valve 17. For example, the first valve 16 and the second valve 17 may be opened in order to discharge the hydrogen-containing gas to the outside of the housing 19 directly from the interior of the first gas passage 13 and the interior of the storage 12. In this event, the operation of the generator 11 may be stopped. Thereafter, the operation of the hydrogen system 100 may be resumed by closing the first valve 16 and the second valve 17 at appropriate time.

The necessity of opening both the first valve 16 and the second valve 17 increases, for example, in the case where hydrogen leakage is detected in the housing 19, in the case where maintenance is performed on the hydrogen system 100, and in similar cases. However, the cases which increase the necessity are not limited to these. The opening of both the first valve 16 and the second valve 17 in the case of the detection of hydrogen leakage in the housing 19 will be discussed in the following example.

The hydrogen system 100 according to the second embodiment thus opens the first valve 16 and the second valve 17, and is accordingly capable of discharging the hydrogen-containing gas from the interior of the housing 19 to the outside of the housing 19 more appropriately than ever.

The hydrogen system 100 according to the second embodiment may be the same as the hydrogen system 100 according to any one of the first embodiment and the first to third examples of the first embodiment, except for the above features.

Example

A hydrogen system 100 according to this example is the same as the hydrogen system 100 according to the first example of the first embodiment, except for the following points involved in control by the controller 50.

When the detector 18 detects hydrogen leakage, the controller opens both the first valve 16 and the second valve 17.

Detailed descriptions will be hereinafter provided for an example of how the hydrogen system 100 according to the example works.

Figure 6:
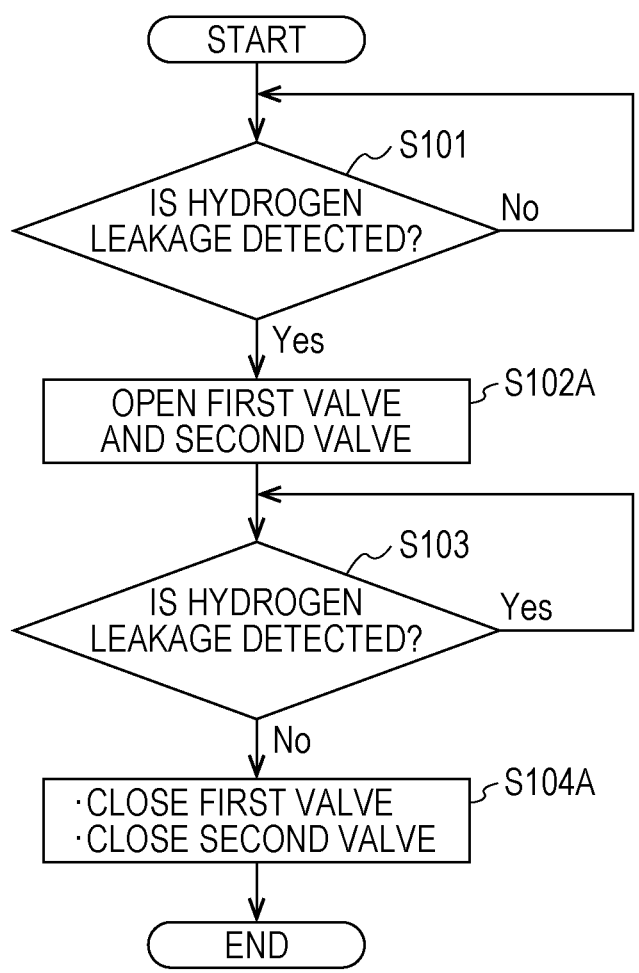
FIG. 6 is a flowchart illustrating an example of how a hydrogen system according to a second embodiment works.

FIG. 6 is a flowchart illustrating the example of how the hydrogen system according to the example of the second embodiment works.

The following working may be performed by the reading of the control program by the arithmetic circuit of the controller 50 from the storage circuit of the controller 50. However, all the following working does not have to be performed by the controller 50, and an operator may perform part of the working.

Steps S101 and S103 in FIG. 6 are the same as steps S101 and S103 in FIG. 3, and detailed descriptions for them will be omitted.

While the hydrogen system 100 is in operation, the first valve 16 and the second valve 17 are closed. While the hydrogen system 100 is in operation, the hydrogen-containing gas generated by the generator 11 is supplied to the storage 12 via the first gas passage 13, and is temporarily stored in the storage 12.

The hydrogen-containing gas stored in the storage 12 is supplied to the hydrogen-using apparatus via the hydrogen supplying passage at appropriate time. Thereby, the hydrogen-using apparatus uses hydrogen in the hydrogen-containing gas.

During this, if the detector 18 detects hydrogen leakage (if Yes in step S101), the first valve 16 and the second valve 17 are opened in step S102A. In this event, the operation of the generator 11 may be stopped.

Next, if the detector 18 no longer detects hydrogen leakage (if No in step S103), the first valve 16 and the second valve 17 are closed in step S104A. Since the first valve 16 and the second valve 17 are opened in step S102A, the opened/closed states of the first valve 16 and the second valve 17 are each switched from the opened state to the closed state in step S104A. Thereafter, the operation of the hydrogen system 100 may be resumed at appropriate time.

As discussed above, the hydrogen system 100 according to the example is capable of solving the hydrogen leakage state more appropriately than ever. Specifically, the hydrogen system 100 according to the example discharges the hydrogen-containing gas to the outside of the housing 19 directly from both the second gas passage 14 and the third gas passage 15 when hydrogen leakage occurs in the housing 19, and is accordingly capable of solving the hydrogen leakage state more quickly than ever.

The hydrogen system 100 according to the example may be the same as the hydrogen system 100 according to any one of the first embodiment, the first to third examples of the first embodiment and the second embodiment, except for the above features.

Third Embodiment

A hydrogen system 100 according to a third embodiment is the same as the hydrogen system 100 according to the first embodiment, except for the following points involved in control by the controller 50.

The controller 50 opens the first valve 16, and closes the second valve 17. For example, the first valve 16 may be opened and the second valve 17 may be closed in order to discharge the hydrogen-containing gas to the outside of the housing 19 directly from the interior of the first gas passage 13. In this event, the operation of the generator 11 may be stopped. Thereafter, the operation of the hydrogen system 100 may be resumed by closing the first valve 16 at appropriate time.

The necessity of opening the first valve 16 and closing the second valve 17 increases, for example, in the case where hydrogen leakage is detected in the housing 19, in the case where maintenance is performed on the hydrogen system 100, and in similar cases. However, the cases which increase the necessity are not limited to these. The opening of the first valve 16 and the closing of the second valve 17 in the case of the detection of hydrogen leakage in the housing 19 will be discussed in the following example.

The hydrogen system 100 according to the third embodiment thus opens the first valve 16, and is accordingly capable of discharging the hydrogen-containing gas from the interior of the first gas passage 13 to the outside of the housing 19 more appropriately than ever.

The hydrogen system 100 according to the third embodiment may be the same as the hydrogen system 100 according to any one of the first embodiment, and the first to third examples of the first embodiment, except for the above features.

Example

A hydrogen system 100 according to this example is the same as the hydrogen system 100 according to the first example of the first embodiment, except for the following points involved in control by the controller 50.

When the detector 18 detects hydrogen leakage, the controller opens the first valve 16, and closes the second valve 17.

Detailed descriptions will be hereinafter provided for an example of how the hydrogen system 100 according to the example works.

Figure 7:
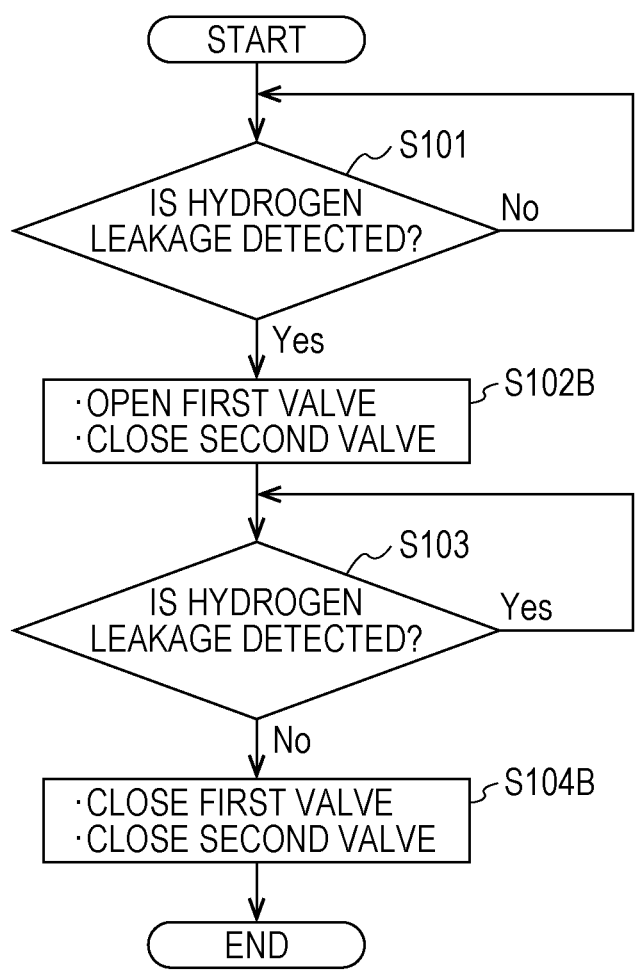
FIG. 7 is a flowchart illustrating an example of how a hydrogen system according to a third embodiment works.

FIG. 7 is a flowchart illustrating the example of how the hydrogen system according to the example of the third embodiment works.

The following working may be performed by the reading of the control program by the arithmetic circuit of the controller 50 from the storage circuit of the controller 50. However, all the following working does not have to be performed by the controller 50, and an operator may perform part of the working.

Steps S101 and S103 in FIG. 7 are the same as steps S101 and S103 in FIG. 3, and detailed descriptions for them will be omitted.

While the hydrogen system 100 is in operation, the first valve 16 and the second valve 17 are closed. While the hydrogen system 100 is in operation, the hydrogen-containing gas generated by the generator 11 is supplied to the storage 12 via the first gas passage 13, and is temporarily stored in the storage 12.

The hydrogen-containing gas stored in the storage 12 is supplied to the hydrogen-using apparatus via the hydrogen supplying passage at appropriate time. Thereby, the hydrogen-using apparatus uses hydrogen in the hydrogen-containing gas.

During this, if the detector 18 detects hydrogen leakage (if Yes in step S101), the first valve 16 is opened and the opened/closed state of the second valve 17 is kept in the closed state in step S102B. In this event, the operation of the generator 11 may be stopped.

Next, if the detector 18 no longer detects hydrogen leakage (if No in step S103), the first valve 16 and the second valve 17 are closed in step S104B. Since the first valve 16 is opened in step S102B, the opened/closed states of the first valve 16 is switched from the opened state to the closed state in step S104B. Thereafter, the operation of the hydrogen system 100 may be resumed at appropriate time.

As discussed above, the hydrogen system 100 according to the example is capable of solving the hydrogen leakage state more appropriately than ever. Specifically, the hydrogen system 100 according to the example discharges the hydrogen-containing gas to the outside of the housing 19 directly from the second gas passage 14 when hydrogen leakage occurs in the housing 19, and is accordingly capable of solving the hydrogen leakage state more quickly than ever.

The hydrogen system 100 according to the example may be the same as the hydrogen system 100 according to any one of the first embodiment, the first to third examples of the first embodiment and the third embodiment, except for the above features.

Fourth Embodiment

A hydrogen system 100 according to the fourth embodiment is the same as the hydrogen system 100 according to the first embodiment, except for the following points involved in control by the controller 50.

The controller 50 closes the first valve 16, and opens the second valve 17. For example, the first valve 16 may be closed and the second valve 17 may be opened in order to discharge the hydrogen-containing gas to the outside of the housing 19 directly from the interior of the storage 12. In this event, the operation of the generator 11 may be stopped. Thereafter, the operation of the hydrogen system 100 may be resumed by closing the second valve 17 at appropriate time.

The necessity of closing the first valve 16 and opening the second valve 17 increases, for example, in the case where hydrogen leakage is detected in the housing 19, in the case where maintenance is performed on the hydrogen system 100, and in similar cases. However, the cases which increase the necessity are not limited to these. The closing of both the first valve 16 and the opening of the second valve 17 in the case of the detection of hydrogen leakage in the housing 19 cases will be discussed in the following example.

The hydrogen system 100 according to the fourth embodiment thus opens the second valve 17, and is accordingly capable of discharging the hydrogen-containing gas from the interior of the storage 12 to the outside of the housing 19 more appropriately than ever.

The hydrogen system 100 according to the fourth embodiment may be the same as the hydrogen system 100 according to any one of the first embodiment and the first to third examples of the first embodiment, except for the above features.

Example

A hydrogen system 100 according to the example is the same as the hydrogen system 100 according to the first example of the first embodiment, except for the following points involved in control by the controller 50.

When the detector 18 detects hydrogen leakage, the controller closes the first valve 16, and opens the second valve 17.

Detailed descriptions will be hereinafter provided for an example of how the hydrogen system 100 according to the example works.

Figure 8:
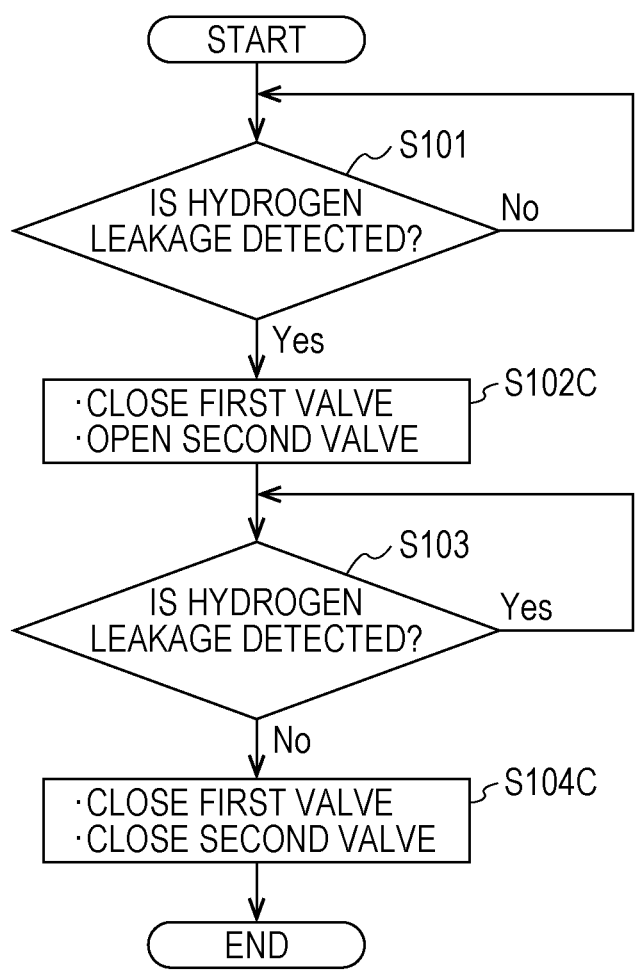
FIG. 8 is a flowchart illustrating an example of how a hydrogen system according to a fourth embodiment works.

FIG. 8 is a flowchart illustrating the example of how the hydrogen system according to the example of the fourth embodiment works.

The following working may be performed by the reading of the control program by the arithmetic circuit of the controller 50 from the storage circuit of the controller 50. However, all the following working does not have to be performed by the controller 50, and an operator may perform part of the working.

Steps S101 and S103 in FIG. 8 are the same as steps S101 and S103 in FIG. 3, and detailed descriptions for them will be omitted.

While the hydrogen system 100 is in operation, the first valve 16 and the second valve 17 are closed. While the hydrogen system 100 is in operation, the hydrogen-containing gas generated by the generator 11 is supplied to the storage 12 via the first gas passage 13, and is temporarily stored in the storage 12.

The hydrogen-containing gas stored in the storage 12 is supplied to the hydrogen-using apparatus via the hydrogen supplying passage at appropriate time. Thereby, the hydrogen-using apparatus uses hydrogen in the hydrogen-containing gas.

During this, if the detector 18 detects hydrogen leakage (if Yes in step S101), the opened/closed state of the first valve 16 is kept in the closed state and the second valve 17 is opened in step S102C. In this event, the operation of the generator 11 may be stopped.

Next, if the detector 18 no longer detects hydrogen leakage (if No in step S103), the first valve 16 and the second valve 17 are closed in step S104C. Since the second valve 17 is opened in step S102C, the opened/closed states of the second valve 17 is switched from the opened state to the closed state in step S104C. Thereafter, the operation of the hydrogen system 100 may be resumed at appropriate time.

As discussed above, the hydrogen system 100 according to the example is capable of solving the hydrogen leakage state more appropriately than ever. Specifically, the hydrogen system 100 according to the example discharges the hydrogen-containing gas to the outside of the housing 19 directly from the third gas passage 15 when hydrogen leakage occurs in the housing 19, and is accordingly capable of solving the hydrogen leakage state more quickly than ever.

The hydrogen system 100 according to the example may be the same as the hydrogen system 100 according to any one of the first embodiment, the first to third examples of the first embodiment and the fourth embodiment, except for the above features.

Fifth Embodiment

Figure 9:
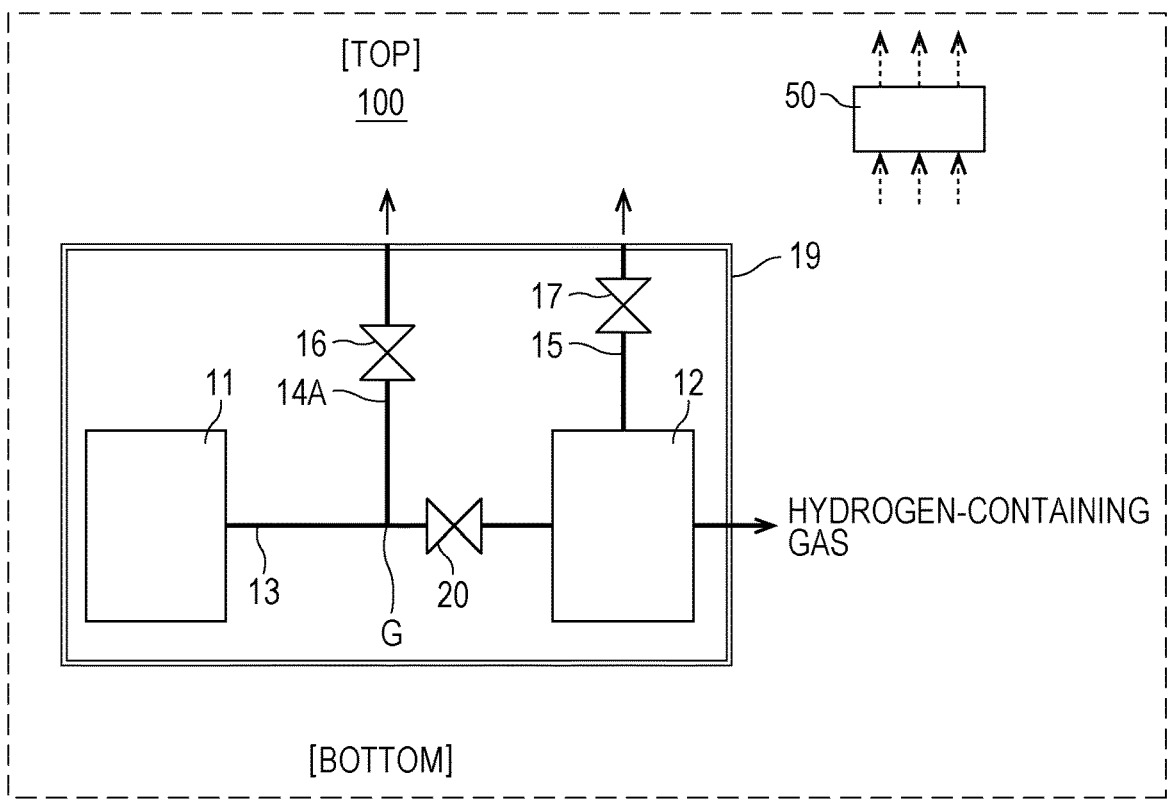
FIG. 9 is a diagram illustrating an example of a hydrogen system according to a fifth embodiment.

FIG. 9 is a diagram illustrating an example of a hydrogen system according to a fifth embodiment.

In the example illustrated in FIG. 9, the hydrogen system 100 includes a generator 11, a storage 12, a first gas passage 13, a second gas passage 14A, a third gas passage 15, a first valve 16, a second valve 17, a third valve 20, a housing 19, and a controller 50.

The generator 11, the storage 12, the first gas passage 13, the third gas passage 15, the first valve 16, the second valve 17, and the housing 19 are the same as those in the first embodiment, and descriptions for them will be omitted.

The third valve 20 is a valve provided to the first gas passage 13 downstream of a branch point G of the first gas passage 13 from which the second gas passage 14A is branched. In other words, the third valve 20 is provided to the first gas passage 13 between the storage 12 and the branch point G. The third valve 20 may be, for example, a solenoid valve, but is not limited to this.

While the controller 50 opens the first valve 16, the controller 50 closes the third valve 20. In this event, the operation of the generator 11 may be stopped. Thereafter, the operation of the hydrogen system 100 may be resumed by closing the first valve 16 and opening the third valve 20 at appropriate time.

Since the second gas passage 14A extends after being branched from the first gas passage 13, there is likelihood that the hydrogen-containing gas in the first gas passage 13 leaks to the interior of the housing 19 through a connecting part where the pipe forming the branched passage like this is connected to the first gas passage 13.

The hydrogen system 100 according to the fifth embodiment is, therefore, configured to be capable of reducing an amount of hydrogen-containing gas leaking to the interior of the housing 19 from the connecting part of the pipe by closing the third valve 20 while the controller 50 opens the first valve 16. In this event, if the second valve 17 is kept in the closed state, the hydrogen system 100 according to the fifth embodiment can inhibit the discharge of the hydrogen-containing gas existing in the storage 12 to the outside of the housing 19 by closing the third valve 20.

The hydrogen system 100 according to the fifth embodiment may be the same as the hydrogen systems 100 according to any one of the first embodiment, the first to third examples of the first embodiment, the second embodiment, the example of the second embodiment, the third embodiment, the example of the third embodiment, the fourth embodiment and the example of the fourth embodiment, except for the above features.

(Modification)

A hydrogen system 100 according to the modification is the same as the hydrogen system 100 according to the fifth embodiment, except for the following points involved in control by the controller 50.

While the controller 50 opens the second valve 17, the controller 50 closes the third valve 20. In this event, the operation of the generator 11 may be stopped. Thereafter, the operation of the hydrogen system 100 may be resumed by closing the second valve 17 and opening the third valve 20 at appropriate time.

Thereby, the hydrogen system 100 according to the modification is capable of discharging the hydrogen-containing gas to the outside of the housing 19 directly from the third gas passage 15 by opening the second valve 17. Furthermore, in this event, for example, the operator can do things such as maintenance of the storage 12 quickly and easily by closing the third valve 20.

The hydrogen system 100 according to the modification may be the same as the hydrogen systems 100 according to any one of the first embodiment, the first to third examples of the first embodiment, the second embodiment, the example of the second embodiment, the third embodiment, the example of the third embodiment, the fourth embodiment, the example of the fourth embodiment, and the fifth embodiment, except for the above features.

Sixth Embodiment

Figure 10:
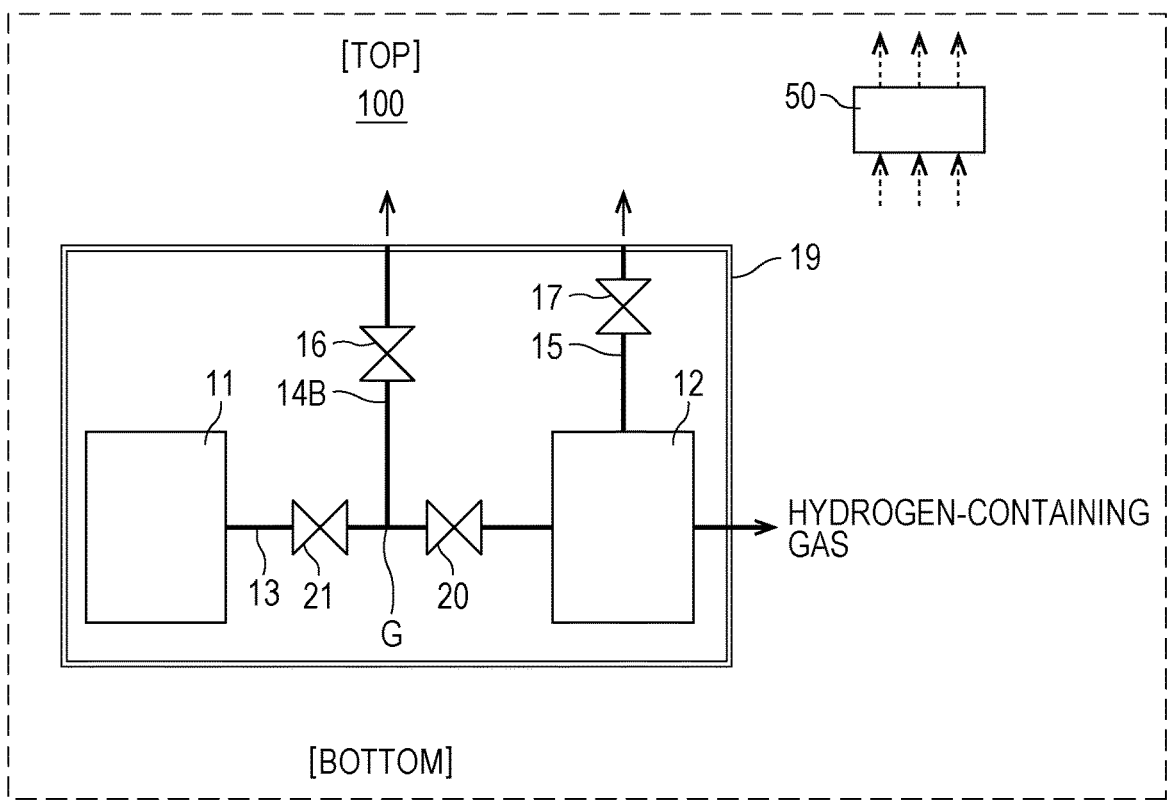
FIG. 10 is a diagram illustrating an example of a hydrogen system according to a sixth embodiment.

FIG. 10 is a diagram illustrating an example of a hydrogen system according to a sixth embodiment.

In the example illustrated in FIG. 10, the hydrogen system 100 includes a generator 11, a storage 12, a first gas passage 13, a second gas passage 14B, a third gas passage 15, a first valve 16, a second valve 17, a third valve 20, a fourth valve 21, a housing 19, and a controller 50.

The generator 11, the storage 12, the first gas passage 13, the third gas passage 15, the first valve 16, the second valve 17, and the housing 19 are the same as those in the first embodiment, and descriptions for them will be omitted. The third valve 20 is the same as that in the fifth embodiment, and descriptions for it will be omitted The fourth valve 21 is a valve provided to the first gas passage 13 upstream of the branch point G from which the second gas passage 14B is branched. In other words, the fourth valve 21 is provided to the first gas passage 13 between the generator 11 and the branch point G. The fourth valve 21 may be, for example, a solenoid valve, but is not limited to this.

For example, while the controller 50 opens the first valve 16, the controller 50 closes the third valve 20, and opens the fourth valve 21. In this event, the operation of the generator 11 may be stopped. Thereafter, the operation of the hydrogen system 100 may be resumed by closing the first valve 16 and opening the third valve 20 at appropriate time.

Otherwise, for example, while the controller 50 opens the first valve 16, the controller 50 closes both the third valve 20 and the fourth valve 21. In this event, the operation of the generator 11 may be stopped. Thereafter, the operation of the hydrogen system 100 may be resumed by closing the first valve 16 and opening the third valve 20 and the fourth valve 21 at appropriate time.

Since the second gas passage 14A extends after being branched from the first gas passage 13, there is likelihood that the hydrogen-containing gas in the first gas passage 13 leaks to the interior of the housing 19 through things such as the connecting part where the pipe forming the branched passage like this is connected to the first gas passage 13.

The hydrogen system 100 according to the sixth embodiment is, therefore, configured to be capable of reducing an amount of hydrogen-containing gas leaking to the interior of the housing 19 through the connecting part of the pipe by closing the third valve 20 while the controller 50 opens the first valve 16. Furthermore, the hydrogen system 100 according to the sixth embodiment is configured to be capable of appropriately stopping the leakage of hydrogen to the interior of the housing 19 through the connecting part of the pipe by closing the third valve 20 and the fourth valve 21 while the controller 50 opens the first valve 16.

In the above case, while the second valve 17 is in the closed state, the hydrogen system 100 according to the sixth embodiment can inhibit the flow of the hydrogen-containing gas existing in the storage 12 to the outside of the housing 19 by closing the third valve 20.

The hydrogen system 100 according to the sixth embodiment may be the same as the hydrogen systems 100 according to any one of the first embodiment, the first to third examples of the first embodiment, the second embodiment, the example of the second embodiment, the third embodiment, the example of the third embodiment, the fourth embodiment, the example of the fourth embodiment, the fifth embodiment, and the modification of the fifth embodiment, except for the above features.

Seventh Embodiment

Figure 11:
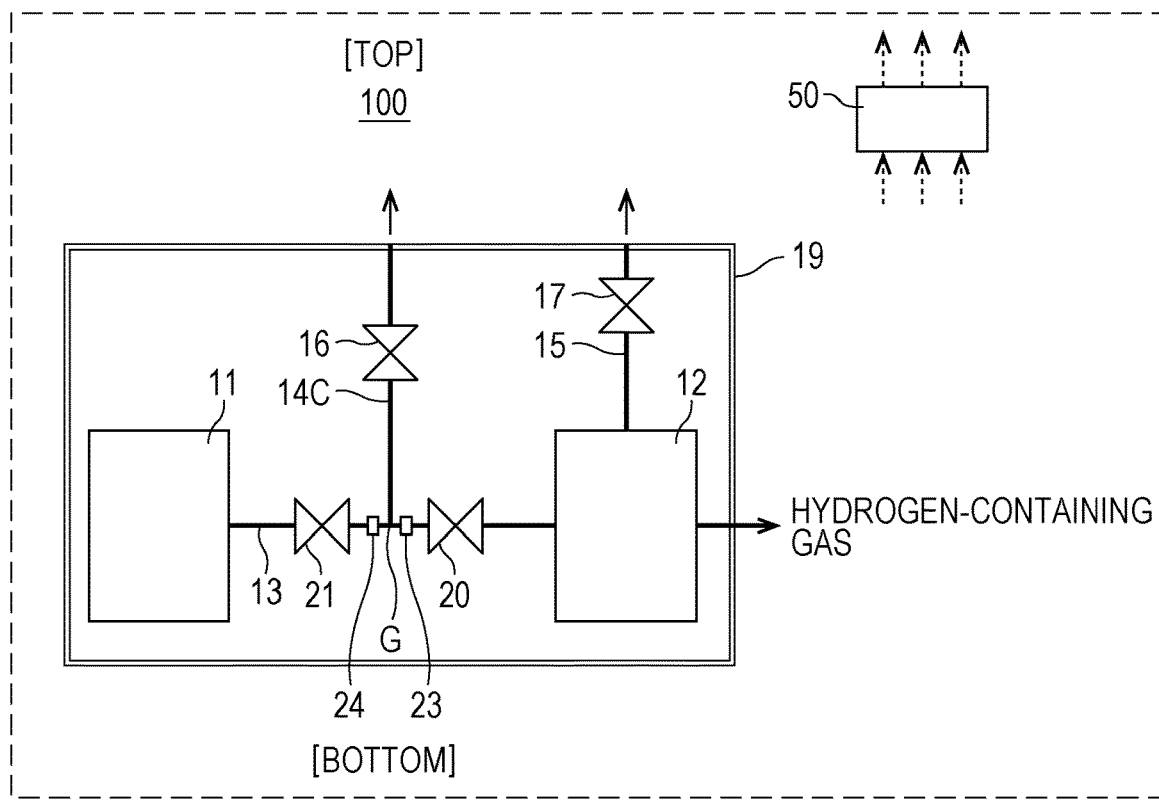
FIG. 11 is a diagram illustrating an example of a hydrogen system according to a seventh embodiment.

FIG. 11 is a diagram illustrating an example of a hydrogen system according to a seventh embodiment.

In the example illustrated in FIG. 11, the hydrogen system 100 includes a generator 11, a storage 12, a first gas passage 13, a second gas passage 14C, a third gas passage 15, a first valve 16, a second valve 17, a housing 19, a third valve 20, a fourth valve 21, a first joint 23, a second joint 24, and a controller 50.

The generator 11, the storage 12, the first gas passage 13, the third gas passage 15, the first valve 16, the second valve 17, the housing 19, the third valve 20, and the fourth valve 21 are the same as those in the sixth embodiment, and descriptions for them will be omitted.

The first joint 23 and the second joint 24 are provided to the first gas passage 13, between the third valve 20 and the fourth valve 21. The second gas passage 14C is branched from the first gas passage 13, between the first joint 23 and the second joint 24. Specifically, the first joint 23 is provided on the first gas passage 13 between the third valve 20 and the branch point G from which the second gas passage 14C is branched, while the second joint 24 is provided on the first gas passage 13 between the branch point G and the fourth valve 21.

The first joint 23 and the second joint 24 are configured to be capable of: fastening the first gas passage 13 in a way that does not allow the hydrogen-containing gas flowing in the first gas passage 13 to leak from the first gas passage 13;

and separating the first gas passage 13. The first joint 23 and the second joint 24 each may be, for example, a pipe joint, but is not limited to this.

Since the second gas passage 14C extends after being branched from the first gas passage 13 between the first joint 23 and the second joint 24, there is likelihood that the hydrogen-containing gas in the first gas passage 13 leaks to the interior of the housing 19 from the first joint 23 and the second joint 24 which form the branch passage like this.

In the hydrogen system 100 according to the seventh embodiment, therefore, the first joint 23 and the second joint 24 are provided to the first gas passage 13 between the third valve 20 and the fourth valve 21. Thereby, the hydrogen system 100 according to the seventh embodiment is capable of appropriately stopping the leakage of hydrogen from the first joint 23 and the second joint 24 to the interior of the housing 19 by opening the first valve 16 and closing the third valve 20 and the fourth valve 21.

The hydrogen system 100 according to the seventh embodiment may be the same as the hydrogen systems 100 according to any one of the first embodiment, the first to third examples of the first embodiment, the second embodiment, the example of the second embodiment, the third embodiment, the example of the third embodiment, the fourth embodiment, the example of the fourth embodiment, the fifth embodiment, the modification of the fifth embodiment, and the sixth embodiment, except for the above features.

Eighth Embodiment

[System Configuration]

Figure 12:
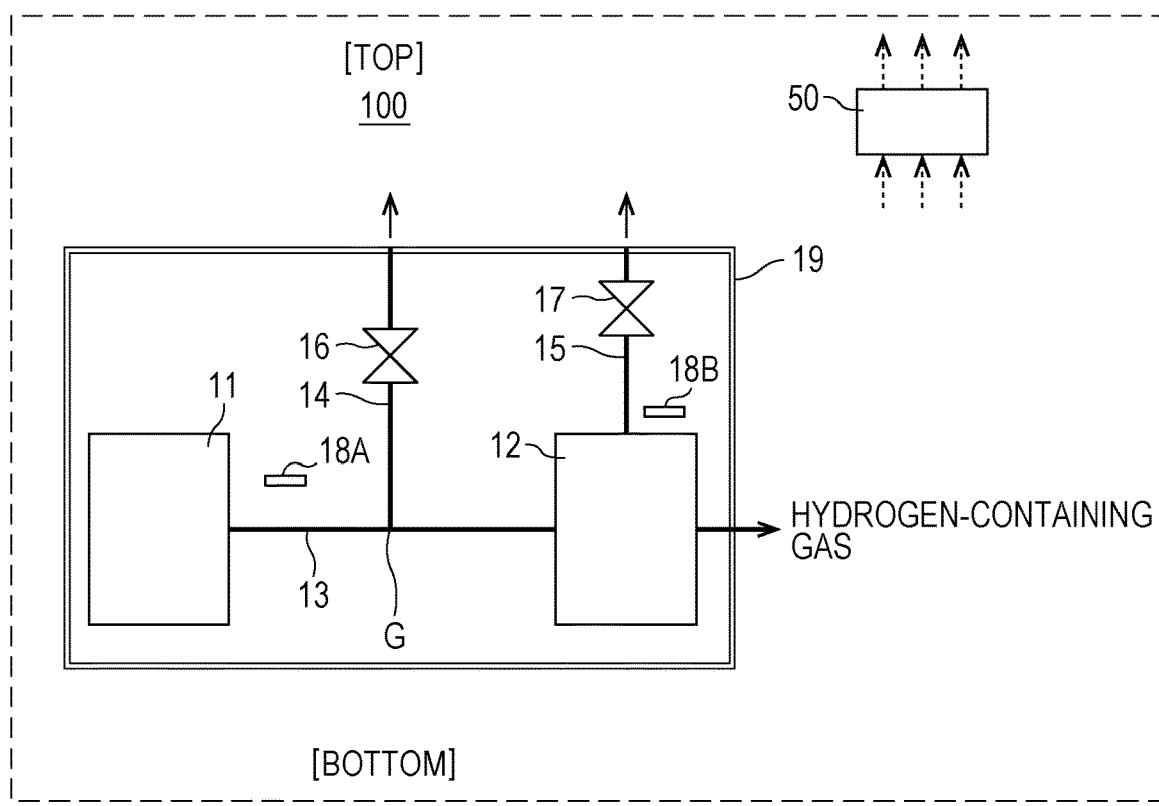
FIG. 12 is a diagram illustrating an example of a hydrogen system according to an eighth embodiment.

FIG. 12 is a diagram illustrating an example of a hydrogen system according to an eighth embodiment.

In the example illustrated in FIG. 12, the hydrogen system 100 includes a generator 11, a storage 12, a first gas passage 13, a second gas passage 14, a third gas passage 15, a first valve 16, a second valve 17, a first detector 18A, a second detector 18B, a housing 19, and a controller 50.

The generator 11, the storage 12, the first gas passage 13, the second gas passage 14, the third gas passage 15, the first valve 16, the second valve 17, and the housing 19 are the same as those in the first embodiment, and descriptions for them will be omitted.

The first detector 18A is a sensor for detecting hydrogen leaking from the first gas passage 13. The second detector 18B is a sensor for detecting hydrogen leaking from the storage 12. For example, the first detector 18A may be provided near the first gas passage 13 in the housing 19, while the second detector 18B may be provided near the storage 12 in the housing 19.

The first detector 18A and the second detector 18B each may have any configuration as long as the configuration makes it possible for the first detector 18A and the second detector 18B to detect hydrogen leakage in the housing 19. Specific examples of the first detector 18A and the second detector 18B are the same as those of the detector 18 in the first example of the first embodiment.

If the first detector 18A detects hydrogen leakage but the second detector 18B detects no hydrogen leakage, the controller 50 opens the first valve 16, and closes the second valve 17.

If the second detector 18B detects hydrogen leakage but the first detector 18A detects no hydrogen leakage, the controller 50 opens the second valve 17, and closes the first valve 16.

[Working]

Referring to the drawings, descriptions will be hereinafter provided for an example of how the hydrogen system 100 according to the eighth embodiment works.

The following working may be performed by the reading of the control program by the arithmetic circuit of the controller 50 from the storage circuit of the controller 50. However, all the following working does not have to be performed by the controller 50, and an operator may perform part of the working.

Figure 13:
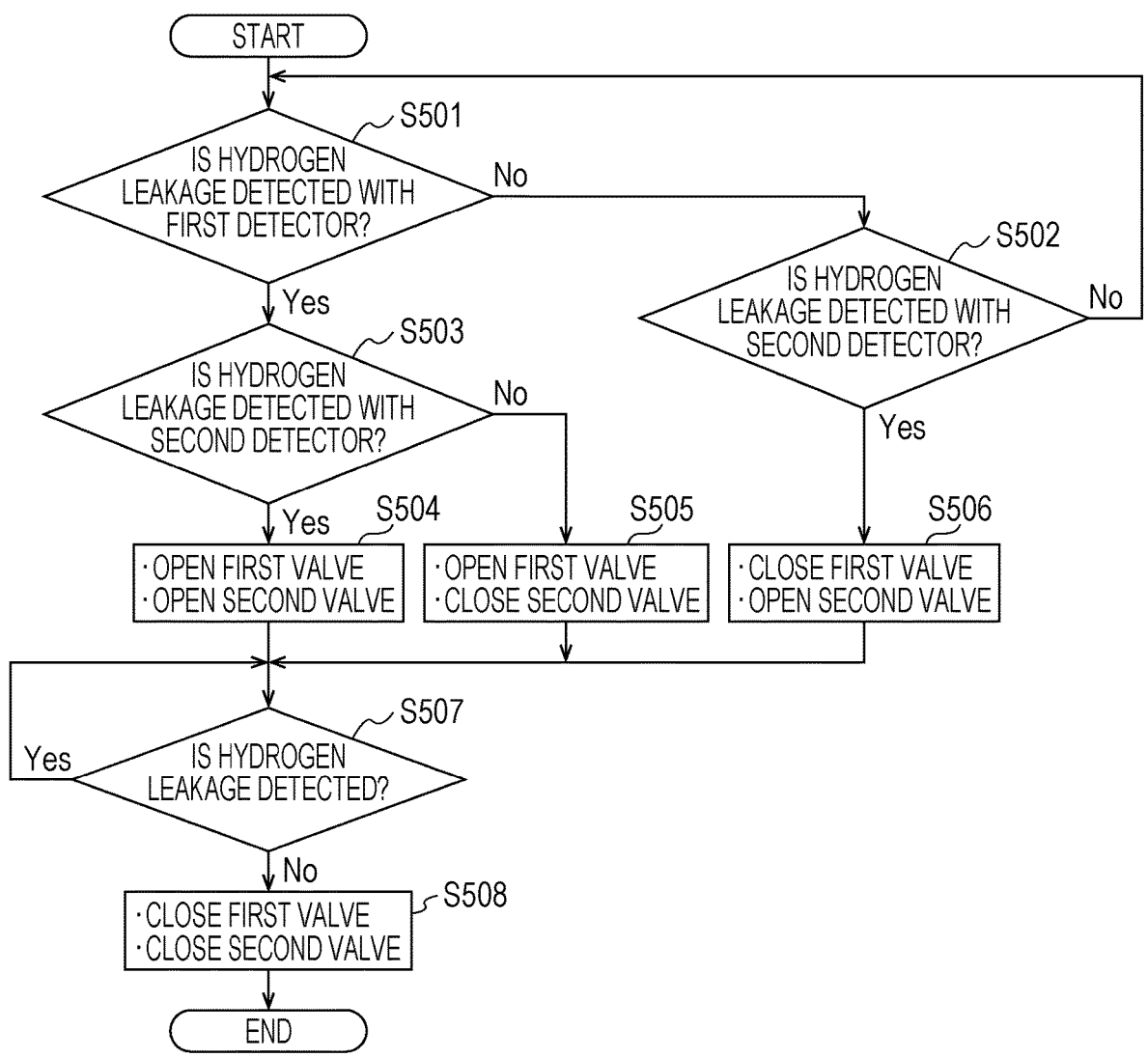
FIG. 13 is a flowchart illustrating an example of how the hydrogen system according to the eighth embodiment works.

FIG. 13 is a flowchart illustrating the example of how the hydrogen system according to the eighth embodiment works.

While the hydrogen system 100 is in operation, the first valve 16 and the second valve 17 are closed. While the hydrogen system 100 is in operation, the hydrogen-containing gas generated by the generator 11 is supplied to the storage 12 via the first gas passage 13, and is temporarily stored in the storage 12.

The hydrogen-containing gas stored in the storage 12 is supplied to the hydrogen-using apparatus via the hydrogen supplying passage at appropriate time. Thereby, the hydrogen-using apparatus uses hydrogen in the hydrogen-containing gas.

While this state continues, it is determined in step S501 whether the first detector 18A detects hydrogen leakage.

If the first detector 18A detects no hydrogen leakage (if No in step S501), the controller 50 proceeds to step S502. In step S502, it is determined whether the second detector 18B detects hydrogen leakage.

If the second detector 18B detects no hydrogen leakage (if No in step S502), the controller 50 returns to step S501, and repeats the determination of step S501.

If the second detector 18B detects hydrogen leakage (if Yes in step S502), there is high likelihood that the hydrogen-containing gas leaks from the storage 12 to the interior of the housing 19. For this reason, the first valve 16 is closed and the second valve 17 is opened in step S506. Incidentally, since the first valve 16 and the second valve 17 are closed while the hydrogen system 100 is in operation, the opened/closed state of the second valve 17 is switched from the closed state to the opened state and the opened/closed state of the first valve 16 is kept in the closed state in step S506. In this event, the operation of the generator 11 may be stopped.

Thereby, the hydrogen-containing gas is discharged from the storage 12 to the outside of the housing 19 via the third gas passage 15.

Thereafter, the controller 50 proceeds to step S507.

In contrast to this, if the first detector 18A detects hydrogen leakage (if Yes in step S501), the controller 50 proceeds to step S503. In step S503, it is determined whether the second detector 18B detects hydrogen leakage.

If the second detector 18B detects no hydrogen leakage (if No in step S503), there is high likelihood that the hydrogen-containing gas leaks from the first gas passage 13 to the interior of the housing 19. For this reason, the first valve 16 is opened and the second valve 17 is closed in step S505. Incidentally, since the first valve 16 and the second valve 17 are closed while the hydrogen system 100 is in operation, the opened/closed state of the first valve 16 is switched from the closed state to the opened state and the opened/closed state of the second valve 17 is kept in the closed state in step S505. In this event, the operation of the generator 11 may be stopped.

Thereby, the hydrogen-containing gas is discharged from the first gas passage 13 to the outside of the housing 19 via the second gas passage 14.

Thereafter, the controller 50 proceeds to step S507.

Otherwise, if the second detector 18B detects hydrogen leakage (if Yes in step S503), there is high likelihood that the hydrogen-containing gas leaks from the first gas passage 13 and the storage 12 to the interior of the housing 19. For this reason, the first valve 16 and the second valve 17 are opened in step S504. Incidentally, since the first valve 16 and the second valve 17 are closed while the hydrogen system 100 is in operation, the opened/closed states of the first valve 16 and the second valve 17 are each switched from the closed state to the opened state in step S504. In this event, the operation of the generator 11 may be stopped.

Thereby, the hydrogen-containing gas is discharged from the first gas passage 13 to the outside of the housing 19 via the second gas passage 14, while the hydrogen-containing gas is discharged from the storage 12 to the outside of the housing 19 via the third gas passage 15.

Thereafter, the controller 50 proceeds to step S507.

The first detector 18A used in step S501 and the second detector 18B used in steps S502 and S503 may be a hydrogen sensor provided inside the housing 19, or a pressure gauge provided in the passages in the housing 19 where the hydrogen-containing gas exists, as in the case of step S101. For this reason, detailed descriptions for how the first detector 18A and the second detector 18B detect hydrogen will be omitted.

Next, in step S507, it is determined whether the first detector 18A and the second detector 18B detect hydrogen leakage.

If either the first detector 18A or the second detector 18B detects hydrogen leakage (if Yes in step S507), the state is kept as it is.

If the first detector 18A or the second detector 18B no longer detects hydrogen leakage (if No in step S507), the first valve 16 and the second valve 17 are closed in step S508. For example, in the case where the first valve 16 and the second valve 17 are opened in step S504, the opened/closed states of the first valve 16 and the second valve 17 are each switched from the opened state to the closed state in step S508. In the case where the first valve 16 is opened and the second valve 17 is closed in step S505, the opened/closed state of the first valve 16 is switched from the opened state to the closed state and the opened/closed state of the second valve 17 is kept in the closed state in step S508. In the case where the first valve 16 is closed and the second valve 17 is opened in step S506, the opened/closed state of the second valve 17 is switched from the opened state to the closed state and the opened/closed state of the first valve 16 is kept in the closed state in step S508. Thereafter, the operation of the hydrogen system 100 may be resumed at appropriate time.

The first detector 18A and the second detector 18B used in step S507 may be a hydrogen sensor provided inside the housing 19, or a pressure gauge provided in the passages in the housing 19 where the hydrogen-containing gas exists, as in the case of step S103. For this reason, detailed descriptions for how the first detector 18A and the second detector 18B detect hydrogen will be omitted.

As discussed above, in the case where the first detector 18A detects hydrogen leakage but the second detector 18B detects no hydrogen leakage, there is high likelihood that the hydrogen-containing gas leaks from the first gas passage 13 to the interior of the housing 19. In this case, the hydrogen system 100 according to the eighth embodiment is capable of reducing an amount of hydrogen-containing gas discharged to the outside of the housing 19 by opening the first valve 16 and closing the second valve 17. Specifically, the hydrogen system 100 according to the eighth embodiment is capable of inhibiting the discharge of the hydrogen-containing gas existing in the storage 12 to the outside of the housing 19, for example, by opening the first valve 16 and concurrently closing the on-off valve provided on the first gas passage 13 between the storage 12 and the branch point G from which the second gas passage 14 is branched. Incidentally, this on-off valve may be the third valve 20 in FIG. 10.

Meanwhile, in the case where the second detector 18B detects hydrogen leakage but the first detector 18A detects no hydrogen leakage, there is high likelihood that the hydrogen-containing gas leaks from the storage 12 to the interior of the housing 19. In this case, the hydrogen system 100 according to the eighth embodiment is capable of reducing an amount of hydrogen-containing gas discharged to the outside of the housing 19 by opening the second valve 17 and closing the first valve 16. Specifically, the hydrogen system 100 according to the eighth embodiment is capable of inhibiting the discharge of the hydrogen-containing gas existing in the generator 11 to the outside of the housing 19, for example, by opening the second valve 17 and concurrently closing the on-off valve provided on the first gas passage 13 between the generator 11 and the branch point G where the second gas passage 14 is branched from the first gas passage 13. Incidentally, this on-off valve may be the fourth valve 21 in FIG. 10.

The hydrogen system 100 according to the eighth embodiment may be the same as the hydrogen systems 100 according to any one of the first embodiment, the first to third examples of the first embodiment, the second embodiment, the example of the second embodiment, the third embodiment, the example of the third embodiment, the fourth embodiment, the example of the fourth embodiment, the fifth embodiment, the modification of the fifth embodiment, the sixth embodiment and the seventh embodiment, except for the above features. For example, although FIG. 12 does not illustrate the third valve 20 or the fourth valve 21 (see FIG. 10) on the first gas passage 13, the third valve 20 and the fourth valve 21 may be provided to the hydrogen system 100 in FIG. 12. Furthermore, for example, although FIG. 12 does not illustrate the first joint 23 or the second joint 24 (see FIG. 11) on the first gas passage 13, the first joint 23 and the second joint 24 may be provided to the hydrogen system 100 in FIG. 12.

Ninth Embodiment

[System Configuration]

Figure 14:
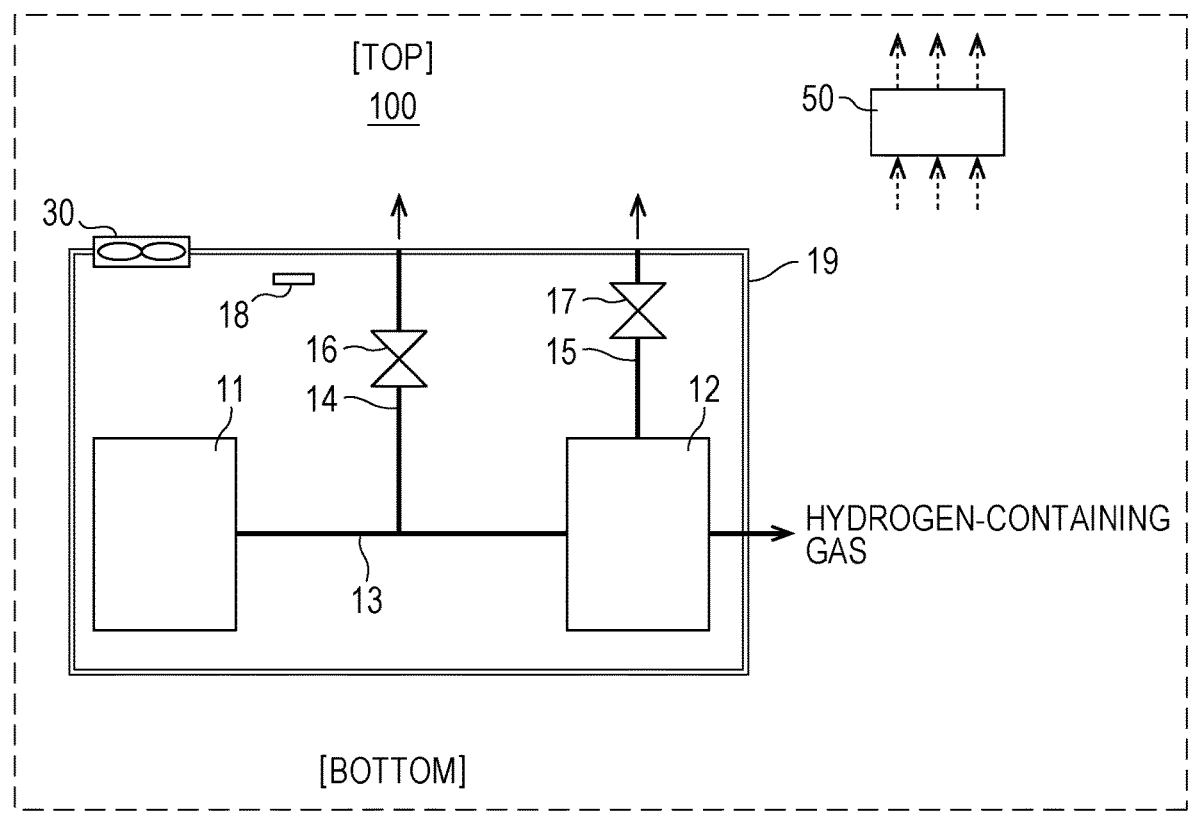
FIG. 14 is a diagram illustrating an example of a hydrogen system according to a ninth embodiment.

FIG. 14 is a diagram illustrating an example of a hydrogen system according to a ninth embodiment.

In the example illustrated in FIG. 14, the hydrogen system 100 includes a generator 11, a storage 12, a first gas passage 13, a second gas passage 14, a third gas passage 15, a first valve 16, a second valve 17, a detector 18, a housing 19, a ventilator 30, and a controller 50.

The generator 11, the storage 12, the first gas passage 13, the second gas passage 14, the third gas passage 15, the first valve 16, the second valve 17, and the housing 19 are the same as those in the first embodiment, and descriptions for them will be omitted. The detector 18 is the same as that in the first example of the first embodiment, and descriptions for it will be omitted.

The ventilator 30 is a device for ventilating the interior of the housing 19. The ventilator 30 may have any configuration as long as the configuration makes it possible for the ventilator 30 to ventilate the interior of the housing 19. For example, the ventilator 30 may be a general ventilator which is provided to a wall part of the housing 19, and which is capable of discharging air from the interior of the housing 19 and letting external air come into the housing 19 through an air inlet provided to the wall part of the housing 19 to replace the discharged air. The ventilator 30 may be, for example, an axial flow-type fan motor, but is not limited to this.

When the detector 18 detects hydrogen leakage, the controller 50 operates the ventilator 30.

[Working]

Referring to the drawings, descriptions will be hereinafter provided for an example of how the hydrogen system 100 according to the ninth embodiment works.

The following working may be performed by the reading of the control program by the arithmetic circuit of the controller 50 from the storage circuit of the controller 50. However, all the following working does not have to be performed by the controller 50, and an operator may perform part of the working.

Figure 15:
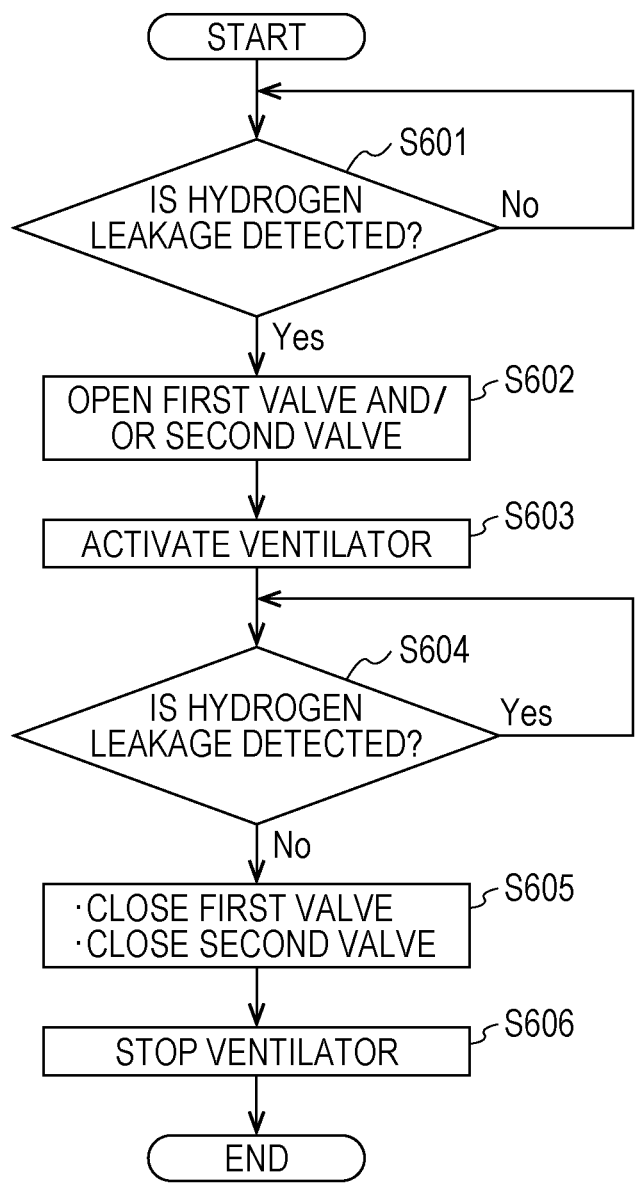
FIG. 15 is a flowchart illustrating an example of how the hydrogen system according to the ninth embodiment works.

FIG. 15 is a flowchart illustrating the example of how the hydrogen system according to the ninth embodiment works.

While the hydrogen system 100 is in operation, the first valve 16 and the second valve 17 are closed. While the hydrogen system 100 is in operation, the hydrogen-containing gas generated by the generator 11 is supplied to the storage 12 via the first gas passage 13, and is temporarily stored in the storage 12.

The hydrogen-containing gas stored in the storage 12 is supplied to the hydrogen-using apparatus via the hydrogen supplying passage at appropriate time. Thereby, the hydrogen-using apparatus uses hydrogen in the hydrogen-containing gas.

While this state continues, it is determined in step S601 whether the detector 18 detects hydrogen leakage.

If the detector 18 detects no hydrogen leakage (if No in step S601), the state is kept as it is.

If the detector 18 detects hydrogen leakage (if Yes in step S601), at least one of the first valve 16 and the second valve 17 is opened in step S602, and the ventilator 30 is operated (ON) in step S603. Thereby, hydrogen-containing air is discharged from the housing 19 to the outside of the housing 19, and external air from the air inlet comes into the housing 19. Furthermore, for example, when the first valve 16 is opened, the hydrogen-containing gas is discharged from the first gas passage 13 to the outside of the housing 19 via the second gas passage 14. Moreover, when the second valve 17 is opened, the hydrogen-containing gas is discharged from the storage 12 to the outside of the housing 19 via the third gas passage 15.

The ventilator 30 may be operated not only after the detector 18 detects hydrogen leakage, but also before the detector 18 detects hydrogen leakage.

The detector 18 used in step S601 may be a hydrogen sensor provided inside the housing 19, or a pressure gauge provided in the passages in the housing 19 where the hydrogen-containing gas exists, as in the case of step S101. For this reason, detailed descriptions for how the detector 18 detects hydrogen will be omitted.

Next, in step S604, it is determined whether the detector 18 detects hydrogen leakage.

If the detector 18 detects hydrogen leakage (if Yes in step S604), the state is kept as it is.

If the detector 18 no longer detects hydrogen leakage (if No in step S604), the first valve 16 and the second valve 17 are closed in step S605, and the operation of the ventilator 30 is stopped in step S606. For example, in the case where the only the first valve 16 is opened in step S602, the opened/closed state of the first valve 16 is switched from the opened state to the closed stage and the opened/closed state of the second valve 17 is kept in the closed state in step S605. Thereafter, the operation of the hydrogen system 100 may be resumed at appropriate time.

The detector 18 used in step S604 may be a hydrogen sensor provided inside the housing 19, or a pressure gauge provided in the passages in the housing 19 where the hydrogen-containing gas exists, as in the case of step S103. For this reason, detailed descriptions for how the detector 18 detects hydrogen will be omitted.

As discussed above, the hydrogen system 100 according to the ninth embodiment operates the ventilator 30 when the detector 18 detects hydrogen leakage. Thereby, the hydrogen system 100 according to the ninth embodiment is capable of discharging the hydrogen-containing gas, leaking into the interior of the housing 19, to the outside of the housing 19 using the operation of the ventilator 30.

The hydrogen system 100 according to the ninth embodiment may be the same as the hydrogen systems 100 according to any one of the first embodiment, the first to third examples of the first embodiment, the second embodiment, the example of the second embodiment, the third embodiment, the example of the third embodiment, the fourth embodiment, the example of the fourth embodiment, the fifth embodiment, the modification of the fifth embodiment, the sixth to eighth embodiments, except for the above features. For example, although FIG. 14 does not illustrate the third valve 20 or the fourth valve 21 (see FIG. 10) on the first gas passage 13, the third valve 20 and the fourth valve 21 may be provided to the hydrogen system 100 in FIG. 14. Furthermore, for example, although FIG. 14 does not illustrate the first joint 23 or the second joint 24 (see FIG. 11) on the first gas passage 13, the first joint 23 and the second joint 24 may be provided to the hydrogen system 100 in FIG. 14. In addition, for example, the detector 18 in FIG. 14 may include the first detector 18A and the second detector 18B (see FIG. 12).

(Modification)

A hydrogen system 100 according to a modification of the ninth embodiment is the same as the hydrogen system 100 according to the ninth embodiment, except for the following points involved in control by the controller 50.

When the detector 18 detects hydrogen leakage, the controller 50 stops the generation of the hydrogen-containing gas by the generator 11, and operates the ventilator 30.

Referring to the drawings, detailed descriptions will be hereinafter provided for an example of how the hydrogen system 100 according to the modification works.

Figure 16:
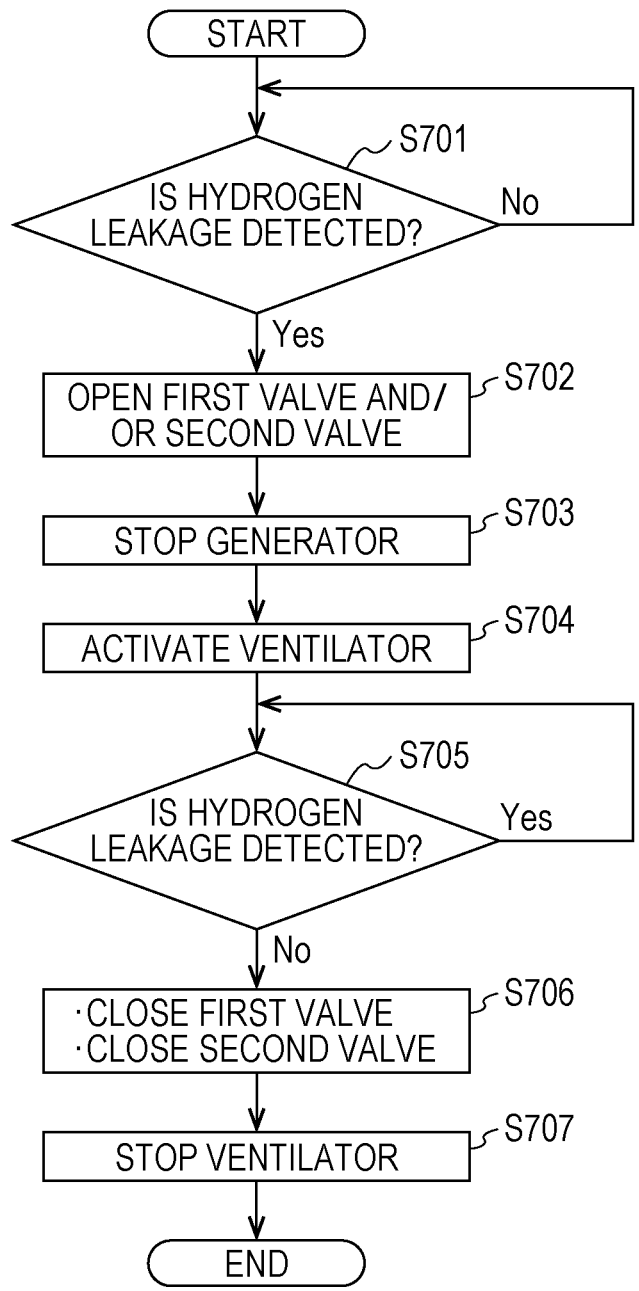
FIG. 16 is a flowchart illustrating an example of how a hydrogen system according to a modification of the ninth embodiment works.

FIG. 16 is a flowchart illustrating the example of how the hydrogen system according to the modification of the ninth embodiment works.

The following working may be performed by the reading of the control program by the arithmetic circuit of the controller 50 from the storage circuit of the controller 50. However, all the following working does not have to be performed by the controller 50, and an operator may perform part of the working.

While the hydrogen system 100 is in operation, the first valve 16 and the second valve 17 are closed. While the hydrogen system 100 is in operation, the hydrogen-containing gas generated by the generator 11 is supplied to the storage 12 via the first gas passage 13, and is temporarily stored in the storage 12.

The hydrogen-containing gas stored in the storage 12 is supplied to the hydrogen-using apparatus via the hydrogen supplying passage at appropriate time. Thereby, the hydrogen-using apparatus uses hydrogen in the hydrogen-containing gas.

While this state continues, it is determined in step S701 whether the detector 18 detects hydrogen leakage.

If the detector 18 detects no hydrogen leakage (if No in step S701), the state is kept as it is.

If the detector 18 detects hydrogen leakage (if Yes in step S701), at least one of the first valve 16 and the second valve 17 is opened in step S702; the operation of the generator 11 is stopped in step S703; and the ventilator 30 is operated (ON) in step S704. Thereby, hydrogen-containing air in the housing 19 is discharged to the outside of the housing 19, and external air from the air inlet flows into the housing 19. Furthermore, for example, when the first valve 16 is opened, the hydrogen-containing gas is discharged from the first gas passage 13 to the outside of the housing 19 via the second gas passage 14. Moreover, when the second valve 17 is opened, the hydrogen-containing gas is discharged from the storage 12 to the outside of the housing 19 via the third gas passage 15.

The ventilator 30 may be operated not only after the detector 18 detects hydrogen leakage, but also while the generator 11 is being operated before the detector 18 detects hydrogen leakage.

When the operation of the hydrogen system 100 is normally stopped while the ventilator 30 is being operated in conjunction with the operation of the generator 11, the operation of generator 11 is stopped and the operation of the ventilator 30 is stopped. In contrast to this, like this, in the case where the detector 18 detects hydrogen leakage, the operation of the generator 11 is stopped but the operation of the ventilator 30 continues. Specifically, the ventilation volume of the ventilator 30 after the stopping of the operation of the generator 11 is smaller when the operation of the hydrogen system 100 is normally stopped than when the operation of the hydrogen system 100 is abnormally stopped based on the hydrogen leakage detection. Incidentally, the stopping of the operation of the ventilator 30 in conjunction with the normal stopping of the operation of the hydrogen system 100 may coincide with the stopping of the operation of the generator 11, or may come before or after the stopping of the operation of the generator 11.

The detector 18 used in step S701 may be a hydrogen sensor provided inside the housing 19, or a pressure gauge provided in the passages in the housing 19 where the hydrogen-containing gas exists, as in the case of step S101. For this reason, detailed descriptions for how the detector 18 detects hydrogen will be omitted.

Next, in step S705, it is determined whether the detector 18 detects hydrogen leakage.

If the detector 18 detects hydrogen leakage (if Yes in step S705), the state is kept as it is.

If the detector 18 no longer detects hydrogen leakage (if No in step S705), the first valve 16 and the second valve 17 are closed in step S706, and the operation of the ventilator 30 is stopped in step S707. For example, in the case where the only the first valve 16 is opened in step S702, the opened/closed state of the first valve 16 is switched from the opened state to the closed stage and the opened/closed state of the second valve 17 is kept in the closed state in step S706. Thereafter, the operation of the hydrogen system 100 may be resumed at appropriate time.

The detector 18 used in step S705 may be a hydrogen sensor provided inside the housing 19, or a pressure gauge provided in the passages in the housing 19 where the hydrogen-containing gas exists, as in the case of step S103. For this reason, detailed descriptions for how the detector 18 detects hydrogen will be omitted.

As discussed above, the hydrogen system 100 according to the modification stops the generation of the hydrogen-containing gas by the generator 11 and operates the ventilator 30, when the detector 18 detects hydrogen leakage. Thereby, after stopping the operation of the generator 11, the hydrogen system 100 according to the modification is capable of discharging the hydrogen-containing gas, leaking to the interior of the housing 19, to the outside of the housing 19 through the operation of the ventilator 30.

The hydrogen system 100 according to the modification may be the same as the hydrogen systems 100 according to any one of the first embodiment, the first to third examples of the first embodiment, the second embodiment, the example of the second embodiment, the third embodiment, the example of the third embodiment, the fourth embodiment, the example of the fourth embodiment, the fifth embodiment, the modification of the fifth embodiment, and the sixth to ninth embodiments, except for the above features.

Tenth Embodiment

Figure 17:
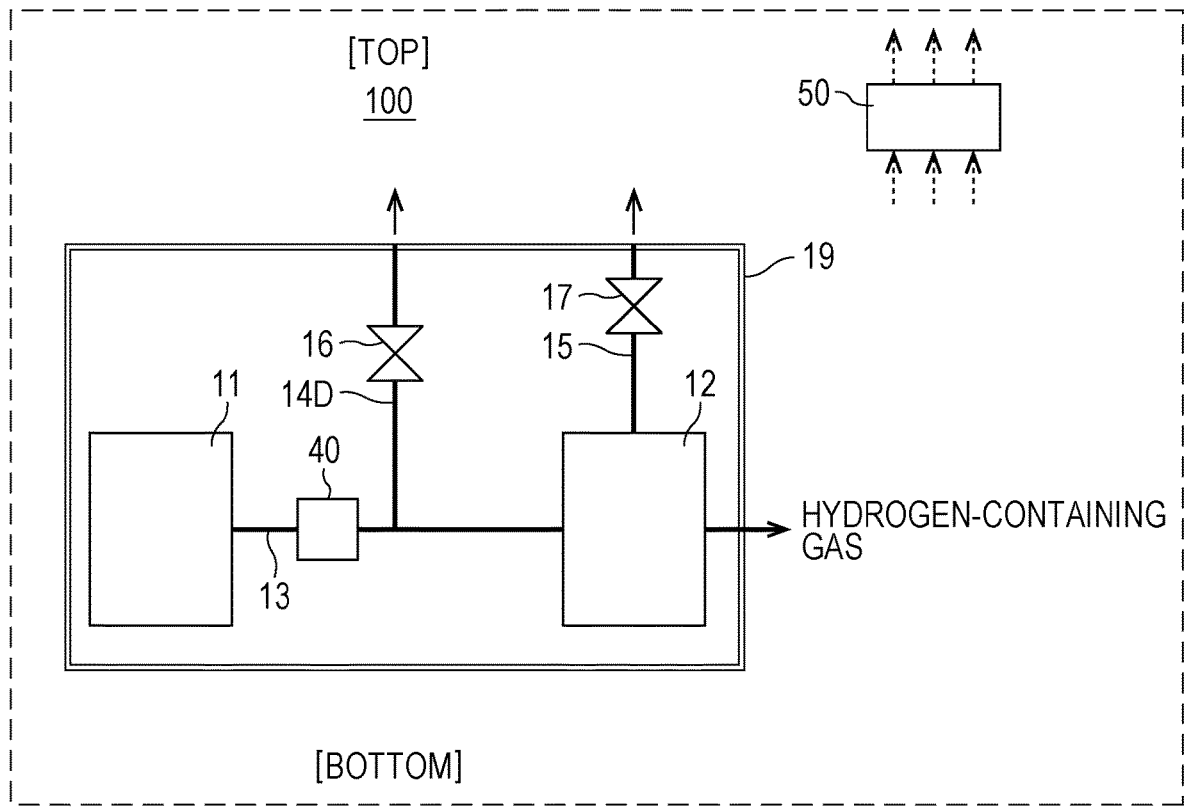
FIG. 17 is a diagram illustrating an example of a hydrogen system according to a tenth embodiment.

FIG. 17 is a diagram illustrating an example of a hydrogen system according to a tenth embodiment.

In the example illustrated in FIG. 17, the hydrogen system 100 includes a generator 11, a storage 12, a first gas passage 13, a second gas passage 14D, a third gas passage 15, a first valve 16, a second valve 17, a housing 19, a pressure booster 40, and a controller 50.

The generator 11, the storage 12, the first gas passage 13, the third gas passage 15, the first valve 16, the second valve 17, and the housing 19 are the same as those in the first embodiment, and descriptions for them will be omitted.

The pressure booster 40 is a device for boosting the pressure of the hydrogen-containing gas generated by the generator 11 to supply the resultant hydrogen-containing gas to the storage 12.

The controller 50 operates the pressure booster 40 while the controller 50 opens the first valve 16.

The pressure booster 40 may have any configuration as long as the configuration makes it possible for the pressure booster 40 to boost the pressure of the hydrogen-containing gas generated by the generator 11 to supply the resultant hydrogen-containing gas to the storage 12. The pressure booster 40 may be, for example, an electrochemical pressure boosting device using solid polymer membranes, or a mechanical pressure boosting device. These pressure boosting devices are publicly known, and detailed descriptions will be omitted.

In the hydrogen system 100 according to the tenth embodiment, the second gas passage 14D is a passage branched from the first gas passage 13 downstream of the pressure booster 40. In other words, the upstream end of the second gas passage 14D is connected to the first gas passage 13 between the pressure booster 40 and the storage 12.

Thus, the hydrogen system 100 according to the tenth embodiment is capable of discharging the hydrogen-containing gas in the interior of the generator 11 and the interior of the storage 12 to the outside of the housing 19 at appropriate time, for example, by appropriately setting the opened state of the first valve 16 and the operational state of the pressure booster 40.

Detailed descriptions will be hereinafter provided for an example of how the hydrogen system 100 according to the tenth embodiment works.

Figure 18:
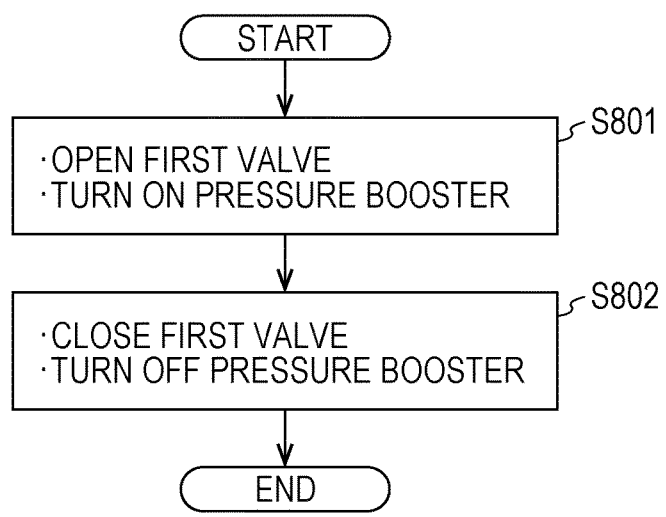
FIG. 18 is a flowchart illustrating an example of how the hydrogen system according to the tenth embodiment works.

FIG. 18 is a flowchart illustrating the example of how the hydrogen system according to the tenth embodiment works.

The following working may be performed by the reading of the control program by the arithmetic circuit of the controller 50 from the storage circuit of the controller 50. However, all the following working does not have to be performed by the controller 50, and an operator may perform part of the working.

While the hydrogen system 100 is in operation, the first valve 16 and the second valve 17 are closed. While the hydrogen system 100 is in operation, the hydrogen-containing gas generated by the generator 11 is supplied to the storage 12 with the pressure of the hydrogen-containing gas boosted by the pressure booster 40. The high-pressure hydrogen-containing gas supplied to the storage 12 via the first gas passage 13 is temporarily stored in the storage 12.

The hydrogen-containing gas stored in the storage 12 is supplied to the hydrogen-using apparatus via the hydrogen supplying passage at appropriate time. Thereby, the hydrogen-using apparatus uses hydrogen in the hydrogen-containing gas.

In step S801, the first valve 16 is opened. As its illustrating is omitted, the opened/closed state of the second valve 17 may be kept in the closed state, or switched to the opened state. Furthermore, in step S801, the pressure booster 40 is operated (ON) while the first valve 16 is opened. In this event, the operation of the generator 11 is stopped.

While the hydrogen system 100 is in operation, the first valve 16 is closed, and the pressure booster 40 is being operated. In step S801, therefore, the opened/closed state of the first valve 16 is switched from the closed state to the opened state, and the operational state of the pressure booster 40 is kept as it is. Thereby, the hydrogen system 100 is capable of discharging the hydrogen-containing gas from the first gas passage 13 to the outside of the housing 19 via the second gas passage 14D. The hydrogen system 100 is also capable of sending the hydrogen-containing gas in the generator 11 to the second gas passage 14D through the pressure boosting operation of the pressure booster 40.

Next, in step S802, the first valve 16 is closed. In addition, in step S802, the operation of the pressure booster 40 is stopped (OFF). Since the first valve 16 is opened and the pressure booster 40 is operated in step S801, the opened/closed state of the first valve 16 is switched from the opened state to the closed state and the operational state of the pressure booster 40 is switched from the ON state to the OFF state in step S802. Although its illustration is omitted, in a case where the second valve 17 is opened in step S801, the opened/closed state of the second valve 17 is switched from the opened state to the closed state in step S802. Thereafter, the operation of the hydrogen system 100 may be resumed at appropriate time.

As discussed above, when opening the first valve 16, the hydrogen system 100 according to the tenth embodiment is capable of appropriately discharging the hydrogen-containing gas in the generator 11 to the outside of the housing 19 via the second gas passage 14D through the pressure boosting operation of the pressure booster 40. This makes it possible for the operator to, for example, do things such as maintenance of the generator 11 quickly and easily.

The hydrogen system 100 according to the tenth embodiment may be the same as the hydrogen systems 100 according to any one of the first embodiment, the first to third examples of the first embodiment, the second embodiment, the example of the second embodiment, the third embodiment, the example of the third embodiment, the fourth embodiment, the example of the fourth embodiment, the fifth embodiment, the modification of the fifth embodiment, the sixth to ninth embodiments and the modification of the ninth embodiment, except for the above features.

Eleventh Embodiment

Figure 19:
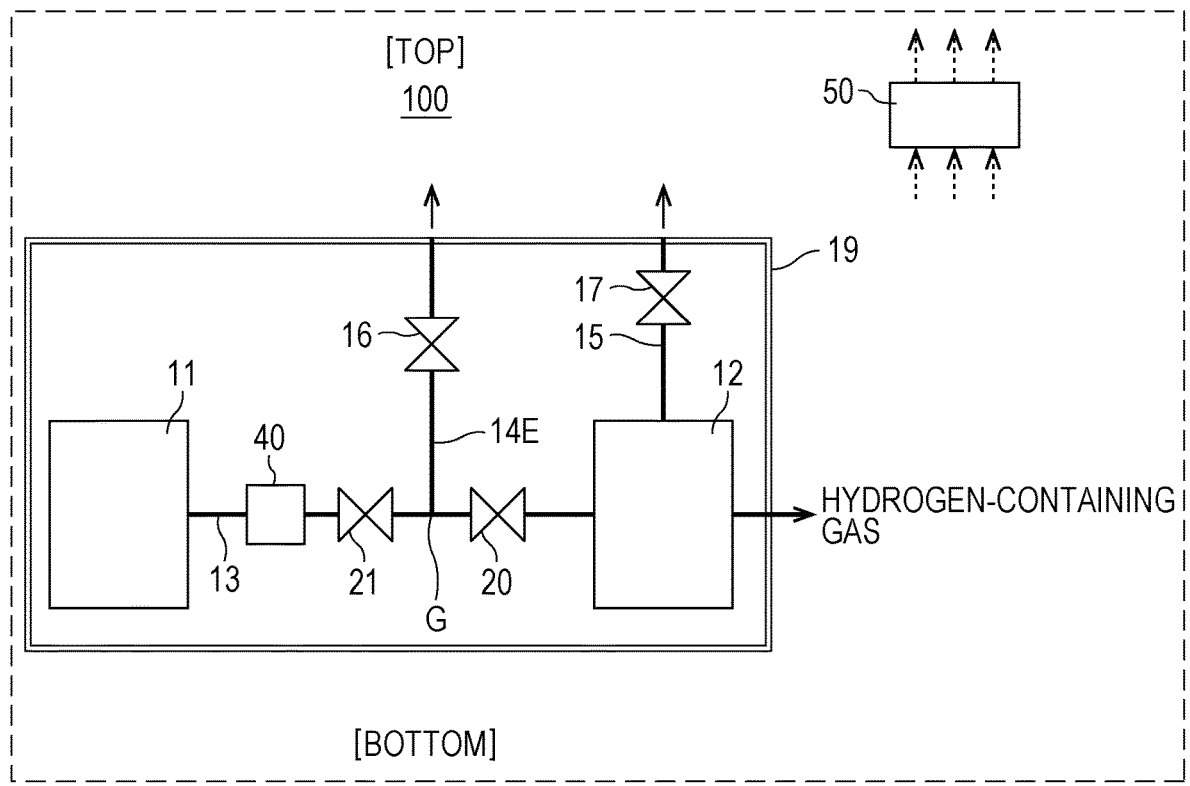
FIG. 19 is a diagram illustrating an example of a hydrogen system according to an eleventh embodiment.

FIG. 19 is a diagram illustrating an example of a hydrogen system according to an eleventh embodiment.

In the example illustrated in FIG. 19, the hydrogen system 100 includes a generator 11, a storage 12, a first gas passage 13, a second gas passage 14E, a third gas passage 15, a first valve 16, a second valve 17, a third valve 20, a fourth valve 21, a housing 19, a pressure booster 40, and a controller 50.

The generator 11, the storage 12, the first gas passage 13, the third gas passage 15, the first valve 16, the second valve 17, and the housing 19 are the same as those in the first embodiment, and descriptions for them will be omitted. The third valve 20 is the same as that in the fifth embodiment, and descriptions for it will be omitted. The fourth valve 21 is the same as that in the sixth embodiment, and descriptions for it will be omitted. The pressure booster 40 is the same as that in the tenth embodiment, and descriptions for it will be omitted.

In the hydrogen system 100 according to the eleventh embodiment, the second gas passage 14E is a passage branched from the first gas passage 13 downstream of the pressure booster 40. In other words, the pressure booster 40 is provided to the first gas passage 13 between the generator 11 and the fourth valve 21 located upstream of the branch point G from which the second gas passage 14A is branched.

The controller 50 does not operate the pressure booster 40 while the first valve 16 is t opened and the third valve 20 and the fourth valve 21 are closed.

Detailed descriptions will be hereinafter provided for an example of how the hydrogen system 100 according to the eleventh embodiment works.

Figure 20:
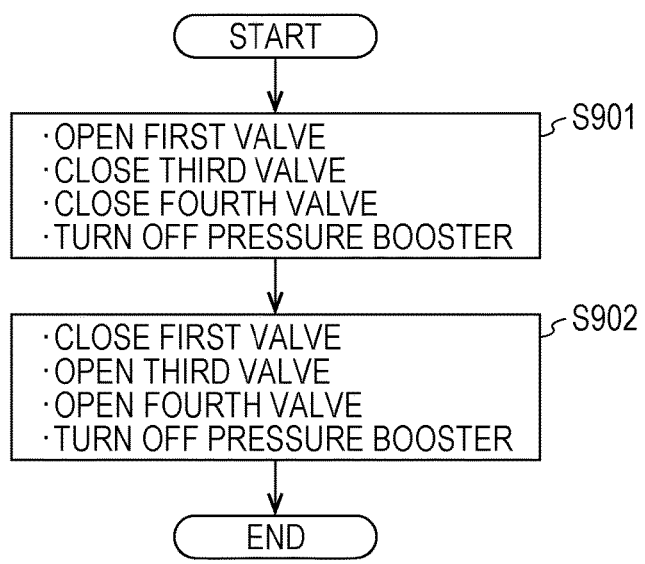
FIG. 20 is a flowchart illustrating an example of how the hydrogen system according to the eleventh embodiment works.

FIG. 20 is a flowchart illustrating the example of how the hydrogen system according to the eleventh embodiment works.

The following working may be performed by the reading of the control program by the arithmetic circuit of the controller 50 from the storage circuit of the controller 50. However, all the following working does not have to be performed by the controller 50, and an operator may perform part of the working.

While the hydrogen system 100 is in operation, the first valve 16 and the second valve 17 are closed, and the third valve 20 and the fourth valve 21 are opened. While the hydrogen system 100 is in operation, the hydrogen-containing gas generated by the generator 11 is supplied to the storage 12 with the pressure of the hydrogen-containing gas boosted by the pressure booster 40. The high-pressure hydrogen-containing gas supplied to the storage 12 via the first gas passage 13 is temporarily stored in the storage 12.

The hydrogen-containing gas stored in the storage 12 is supplied to the hydrogen-using apparatus via the hydrogen supplying passage at appropriate time. Thereby, the hydrogen-using apparatus uses hydrogen in the hydrogen-containing gas.

In step S901, the first valve 16 is opened and the third valve 20 and the fourth valve 21 are closed. In addition, in step S901, the pressure booster 40 is not operated (OFF) when the first valve 16 is opened and the third valve 20 and the fourth valve 21 are closed. In other words, the operation of the pressure booster 40 is stopped. In this event, the operation of the generator 11 is stopped, too.

While the hydrogen system 100 is in operation, the first valve 16 and the second valve 17 are closed; the third valve 20 and the fourth valve 21 are opened; and the pressure booster 40 is being operated. For this reason, in step S901, the opened/closed state of the first valve 16 is switched from the closed state to the opened state; the opened/closed states of the third valve 20 and the fourth valve 21 are each switched from the opened state to the closed state; and the operational state of the pressure booster 40 is switched from the ON state to the OFF state. Although its illustration is omitted, the opened/closed state of the second valve 17 may be kept in the closed, or may be switched to the opened state. If the second valve 17 is opened, the hydrogen-containing gas in the storage 12 can be discharged to the outside of the housing 19 via the third gas passage 15. Although the third valve 20 is closed in the step S901 in FIG. 20, the opened/closed state of the third valve 20 may be kept in the opened state.

Next, in step S902, the first valve 16 is closed and the third valve 20 and the fourth valve 21 are opened. In addition, in step S902, the pressure booster 40 is not operated (OFF). Since the first valve 16 is opened, the third valve 20 and the fourth valve 21 are closed and the operation of the pressure booster 40 is stopped in step S901, the opened/closed state of the first valve 16 is switched from the opened state to the closed state, the opened/closed states of the third valve 20 and the fourth valve 21 are each switched from the closed state to the opened state and the operational state of the pressure booster 40 is kept as it is, in step S902. Thereafter, the operation of the hydrogen system 100 may be resumed at appropriate time.

As discussed above, although opening the first valve 16, the hydrogen system 100 according to the tenth embodiment does not operate the pressure booster 40 provided between the generator 11 and the fourth valve 21 when closing the fourth valve 21. Thereby, the hydrogen system 100 is capable of reducing a risk of damage to the pressure booster 40. The hydrogen system 100 is also capable of reducing electric power needed to operate the pressure booster 40.

The hydrogen system 100 according to the eleventh embodiment may be the same as the hydrogen systems 100 according to any one of the first embodiment, the first to third examples of the first embodiment, the second embodiment, the example of the second embodiment, the third embodiment, the example of the third embodiment, the fourth embodiment, the example of the fourth embodiment, the fifth embodiment, the modification of the fifth embodiment, the sixth to ninth embodiments, the modification of the ninth embodiment, and the tenth embodiment, except for the above features.

Twelfth Embodiment

Figure 21:
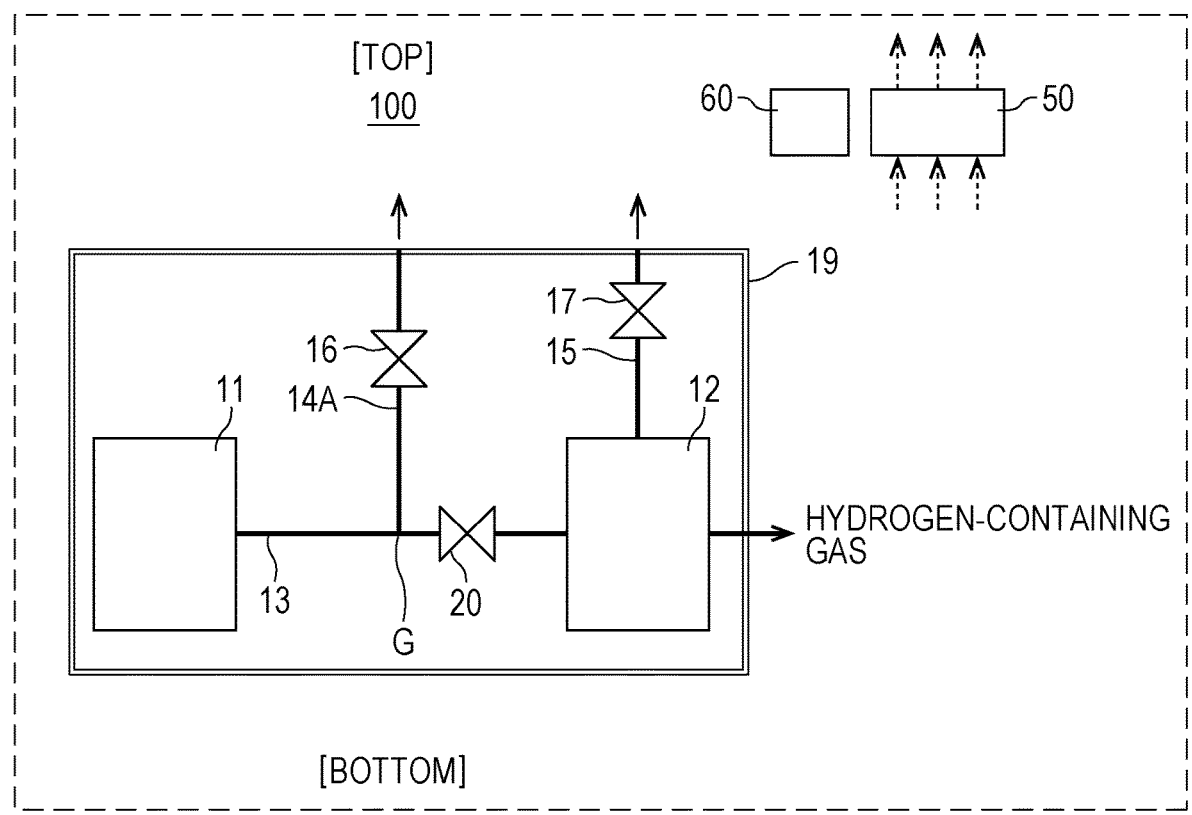
FIG. 21 is a diagram illustrating an example of a hydrogen system according to a twelfth embodiment.

FIG. 21 is a diagram illustrating an example of a hydrogen system according to a twelfth embodiment.

In the example illustrated in FIG. 21, the hydrogen system 100 includes a generator 11, a storage 12, a first gas passage 13, a second gas passage 14A, a third gas passage 15, a first valve 16, a second valve 17, a third valve 20, a housing 19, a receiver 60, and a controller 50.

The generator 11, the storage 12, the first gas passage 13, the third gas passage 15, the first valve 16, the second valve 17, and the housing 19 are the same as those in the first embodiment, and descriptions for them will be omitted. The third valve 20 and the second gas passage 14A are the same as those in the fifth embodiment, and descriptions for them will be omitted.

The receiver 60 is a device for receiving an input from the outside.

Based on an input received by the receiver 60, the controller 50 performs a first mode of opening the first valve 16 and the second valve 17, or a second mode of closing the second valve 17 and the third valve 20 and opening the first valve 16.

The receiver 60 may have any configuration as long as the configuration makes it possible for the receiver 60 to receive an input from the outside.

The receiver 60 may be, for example, a manipulation device such as a tough panel. In this case, input sections to be used for performing the first mode and the second mode respectively are provided on the screen of the manipulation device. When the operator touches one of the input sections on the screen, the manipulation device receives an external input for performing the corresponding one of the first mode and the second mode.

Otherwise, the receiver 60 may be, for example, a wireless communication device. In this case, when the operator manipulates an information mobile terminal (for example, a smartphone), the communication device receives an external input for performing the corresponding one of the first mode and the second mode.

Detailed descriptions will be hereinafter provided for an example of how the hydrogen system 100 according to the twelfth embodiment works.

Figure 22:
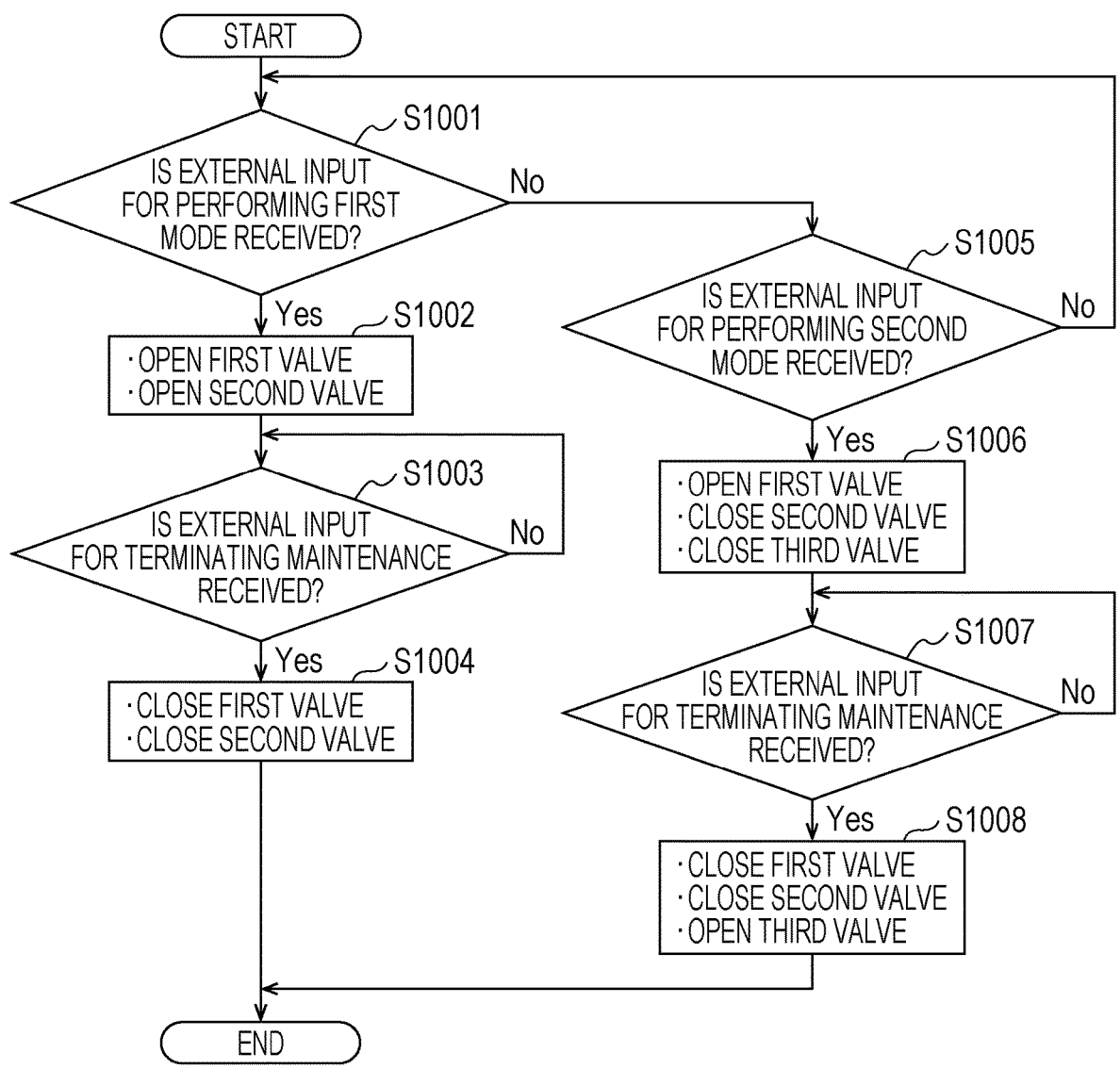
FIG. 22 is a flowchart illustrating an example of how the hydrogen system according to the twelfth embodiment works.

FIG. 22 is a flowchart illustrating the example of how the hydrogen system according to the twelfth embodiment works.

The following working may be performed by the reading of the control program by the arithmetic circuit of the controller 50 from the storage circuit of the controller 50. However, all the following working does not have to be performed by the controller 50, and an operator may perform part of the working.

While the hydrogen system 100 is in operation, the first valve 16 and the second valve 17 are closed, and the third valve 20 is opened. While the hydrogen system 100 is in operation, the hydrogen-containing gas generated by the generator 11 is supplied to the storage 12 via the first gas passage 13, and is temporarily stored in the storage 12.

The hydrogen-containing gas stored in the storage 12 is supplied to the hydrogen-using apparatus via the hydrogen supplying passage at appropriate time. Thereby, the hydrogen-using apparatus uses hydrogen in the hydrogen-containing gas.

When maintenance is performed on the hydrogen system 100, it is determined in step S1001 whether the receiver 60 receives an external input for performing the first mode, as illustrated in FIG. 22.

If the receiver 60 receives the external input for performing the first mode (if Yes in step S1001), the first valve 16 and the second valve 17 are opened in step S1002. Although its illustration is omitted, the opened/closed state of the third valve 20 may be kept in the opened state, or may be switched to the closed state.

Thereby, the first mode is performed, and the interior of the generator 11 and the interior of the storage 12 communicate with the outside of the housing 19 (for example, the atmosphere). Thus, the hydrogen-containing gas in the interior of the generator 11 and the interior of the storage 12 can be discharged to the outside of the housing 19 via the second gas passage 14A and the third gas passage 15.

Next, in step S1003, it is determined whether the receiver 60 receives an external input for terminating the maintenance.

If the receiver 60 receives no external input for terminating the maintenance (if No in step S1003), the state is kept as it is.

If the receiver 60 receives the external input for terminating the maintenance (if Yes in step S1003), the first valve 16 and the second valve 17 are closed in step S1004. Although its illustration is omitted, in a case where the third valve 20 is closed in step S1002, the opened/closed state of the third valve 20 is switched from the closed state to the opened state in step S1004. Thereafter, the operation of the hydrogen system 100 may be resumed at appropriate time.

If the receiver 60 receives no external input for performing the first mode in step S1001 (if No in step S1001), the controller 50 proceeds to step S1005. In step S1005, it is determined whether the receiver 60 receives an external input for performing the second mode.

If the receiver 60 receives no external input for performing the second mode (if No in step S1005), the controller 50 returns to step S1001, and performs the determination operation of step S1001 at appropriate time.

If the receiver 60 receives the external input for performing the second mode (if Yes in step S1005), the first valve 16 is opened; the third valve 20 is closed; and the closed/opened state of the second valve 17 is kept in the closed state in step S1006. Thereby, the second mode is performed. Thus, the communication of the interior of the storage 12 with the outside of the housing 19 is disrupted by the second valve 17 and the third valve 20, and the interior of the generator 11 communicates with the outside of the housing 19. This makes it possible to discharge the hydrogen-containing gas in the generator 11 to the outside of the housing 19 via the second gas passage 14A.

Next, in step S1007, it is determined whether the receiver 60 receives an external signal for terminating the maintenance.

If the receiver 60 receives no external signal for terminating the maintenance (if No in step S1007), the state is kept as it is.

If the receiver 60 receives the external signal for terminating the maintenance (if Yes in step S1007), the first valve 16 is closed, the third valve 20 is opened, and the opened/closed state of the second valve 17 is kept in the closed state, in step S1008. Thereafter, the operation of the hydrogen system 100 may be resumed at appropriate time.

As discussed above, the hydrogen system 100 according to the twelfth is capable of discharging hydrogen for the maintenance purpose more appropriately than ever.

For example, when the maintenance is performed on the generator 11, in the hydrogen system 100 according to the twelfth embodiment, the controller 50 performs the second mode of closing the second valve 17 and the third valve 20 and opening the first valve 16, based on the input received by the receiver 60. Thereby, the communication of the interior of the storage 12 with the outside of the housing 19 is disrupted by the second valve 17 and the third valve 20, and no hydrogen-containing gas in the storage 12 is accordingly discharged to the outside of the housing 19.

Thus, the hydrogen system 100 according to the twelfth embodiment is capable of keeping the hydrogen-containing gas in the storage 12 staying therein in a case where no maintenance need be performed on the storage 12, when maintenance is performed on the generator 11 in the hydrogen system 100.

The hydrogen system 100 according to the twelfth embodiment may be the same as the hydrogen systems 100 according to any one of the first embodiment, the first to third examples of the first embodiment, the second embodiment, the example of the second embodiment, the third embodiment, the example of the third embodiment, the fourth embodiment, the example of the fourth embodiment, the fifth embodiment, the modification of the fifth embodiment, the sixth to ninth embodiments, the modification of the ninth embodiment, the tenth embodiment and the eleventh embodiments, except for the above features.

Thirteenth Embodiment

Figure 23:
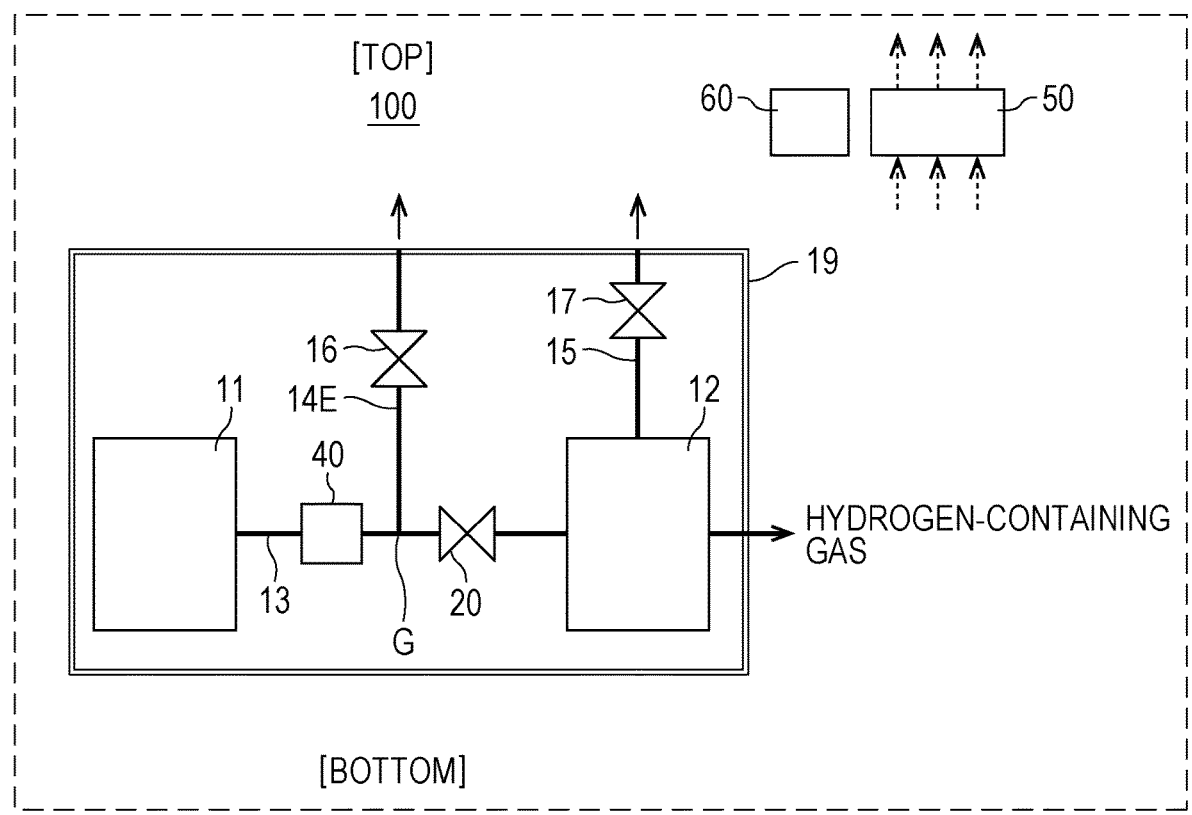
FIG. 23 is a diagram illustrating an example of a hydrogen system according to a thirteenth embodiment.

FIG. 23 is a diagram illustrating an example of a hydrogen system according to a thirteenth embodiment.

In the example illustrated in FIG. 23, the hydrogen system 100 includes a generator 11, a storage 12, a first gas passage 13, a second gas passage 14E, a third gas passage 15, a first valve 16, a second valve 17, a third valve 20, a housing 19, a pressure booster 40, a receiver 60, and a controller 50.

The generator 11, the storage 12, the first gas passage 13, the third gas passage 15, the first valve 16, the second valve 17, and the housing 19 are the same as those in the first embodiment, and descriptions for them will be omitted. The third valve 20 is the same as that in the fifth embodiment, and descriptions for it will be omitted. The pressure booster 40 is the same as that in the tenth embodiment, and descriptions for it will be omitted. The second gas passage 14E is the same as that in the eleventh embodiment, and descriptions for it will be omitted. The receiver 60 is the same as that in the twelfth embodiment, and descriptions for it will be omitted.

The controller 50 operates the pressure booster 40 in the first mode of opening the first valve 16 and the second valve 17, and in the second mode of closing the second valve 17 and the third valve 20 and opening the first valve 16.

Detailed descriptions will be hereinafter provided for an example of how the hydrogen system 100 according to the thirteenth embodiment works.

Figure 24:
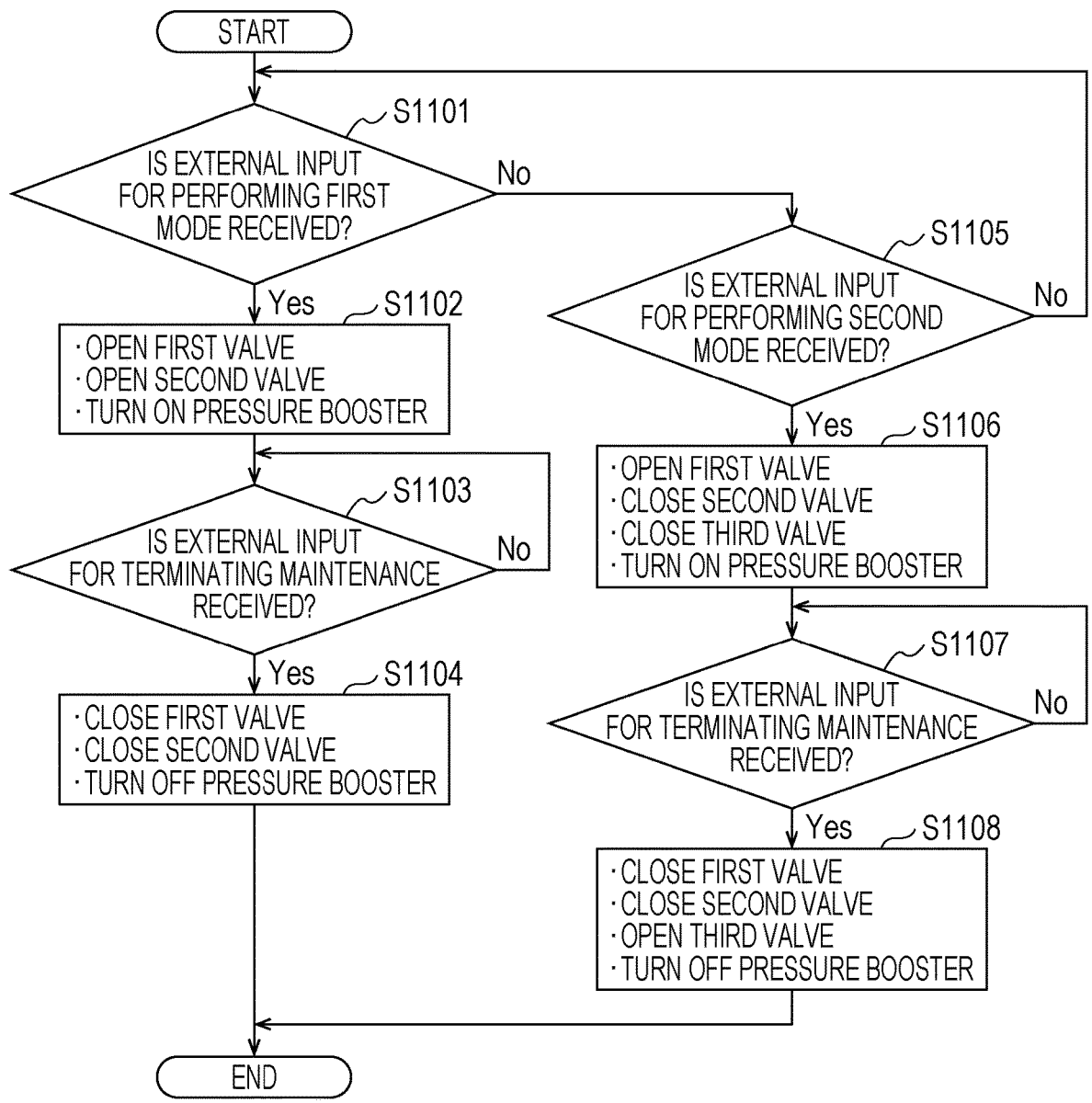
FIG. 24 is a flowchart illustrating an example of how the hydrogen system according to the thirteenth embodiment works.

FIG. 24 is a flowchart illustrating the example of how the hydrogen system according to the thirteenth embodiment works.

The following working may be performed by the reading of the control program by the arithmetic circuit of the controller 50 from the storage circuit of the controller 50. However, all the following working does not have to be performed by the controller 50, and an operator may perform part of the working.

Steps S1101, S1103, S1105 and S1107 in FIG. 24 are the same as steps S1001, S1003, S1005 and S1007 in FIG. 22, and detailed descriptions for them will be omitted.

While the hydrogen system 100 is in operation, the first valve 16 and the second valve 17 are closed and the third valve 20 is opened. While the hydrogen system 100 is in operation, the hydrogen-containing gas generated by the generator 11 is supplied to the storage 12 with the pressure of the hydrogen-containing gas boosted by the pressure booster 40. The high-pressure hydrogen-containing gas supplied to the storage 12 via the first gas passage 13 is temporarily stored in the storage 12.

The hydrogen-containing gas stored in the storage 12 is supplied to the hydrogen-using apparatus via the hydrogen supplying passage at appropriate time. Thereby, the hydrogen-using apparatus uses hydrogen in the hydrogen-containing gas.

If the receiver 60 receives the external input for performing the first mode (if Yes in step S1101), the first valve 16 and the second valve 17 are opened and the pressure booster 40 is operated (ON) in step S1102. Although its illustration is omitted, the opened/closed state of the third valve 20 may be kept in the opened state, or may be switched to the closed state.

Thereby, the first mode is performed to make the interior of the generator 11 and the interior of the storage 12 communicate with the outside of the housing 19 (for example, the atmosphere). Thus, the hydrogen-containing gas in the interior of the generator 11 and the interior of the storage 12 can be discharged to the outside of the housing 19 via the second gas passage 14E and the third gas passage 15. Furthermore, in the first mode, the hydrogen-containing gas in the interior of the generator 11 can be made to flow to the second gas passage 14E through the pressure boosting operation of the pressure booster 40.

If the receiver 60 receives the external input for terminating the maintenance (if Yes in step S1103), the first valve 16 and the second valve 17 are closed and the operation of the pressure booster 40 is stopped (OFF) in step S1104. Although its illustration is omitted, in a case where the third valve 20 is closed in step S1102, the opened/closed state of the third valve 20 is switched from the closed state to the opened state in step S1104. Thereafter, the operation of the hydrogen system 100 may be resumed at appropriate time.

If the receiver 60 receives the external input for performing the second mode (if Yes in step S1105), the first valve 16 is opened, the third valve 20 is closed, and the closed/opened state of the second valve 17 is kept in the closed state in step S1106. In addition, the pressure booster 40 is operated (ON). Thereby, the second mode is performed to disrupt the communication of the interior of the storage 12 with the outside of the housing 19 by the second valve 17 and the third valve 20, and to make the interior of the generator 11 communicate with the outside of the housing 19. This makes it possible to discharge the hydrogen-containing gas in the interior of the generator 11 to the outside of the housing 19 via the second gas passage 14E. Furthermore, in the second mode, the hydrogen-containing gas in the interior of the generator 11 can be made to flow to the second gas passage 14E through the pressure boosting operation of the pressure booster 40.

If the receiver 60 receives the external signal for terminating the maintenance (if Yes in step S1107), the first valve 16 is closed, the third valve 20 is opened, and the opened/closed state of the second valve 17 is kept in the closed state, in step S1108. In addition, the operation of the pressure booster 40 is stopped (OFF). Thereafter, the operation of the hydrogen system 100 may be resumed at appropriate time.

As discussed above, the hydrogen system 100 according to the thirteenth embodiment is capable of appropriately discharging the hydrogen-containing gas in the interior of the generator 11 to the outside of the housing 19 via the second gas passage 14E through the pressure boosting operation of the pressure booster 40, in the first mode and the second mode.

The hydrogen system 100 according to the thirteenth embodiment may be the same as the hydrogen systems 100 according to any one of the first embodiment, the first to third examples of the first embodiment, the second embodiment, the example of the second embodiment, the third embodiment, the example of the third embodiment, the fourth embodiment, the example of the fourth embodiment, the fifth embodiment, the modification of the fifth embodiment, the sixth to ninth embodiments, the modification of the ninth embodiment, and the tenth to twelfth embodiments, except for the above features.

Fourteenth Embodiment

A hydrogen system 100 according to a fourteenth embodiment is the same as the hydrogen system 100 according to the twelfth embodiment, except for the following points involved in control by the controller 50.

Based on an input received by the receiver 60, the controller 50 performs the first mode of opening the first valve 16 and the second valve 17, the second mode of closing the second valve 17 and the third valve 20 and opening the first valve 16, or a third mode of closing the first valve 16 and the third valve 20 and opening the second valve 17.

Detailed descriptions will be hereinafter provided for an example of how the hydrogen system 100 according to the fourteenth embodiment works.

Figure 25:
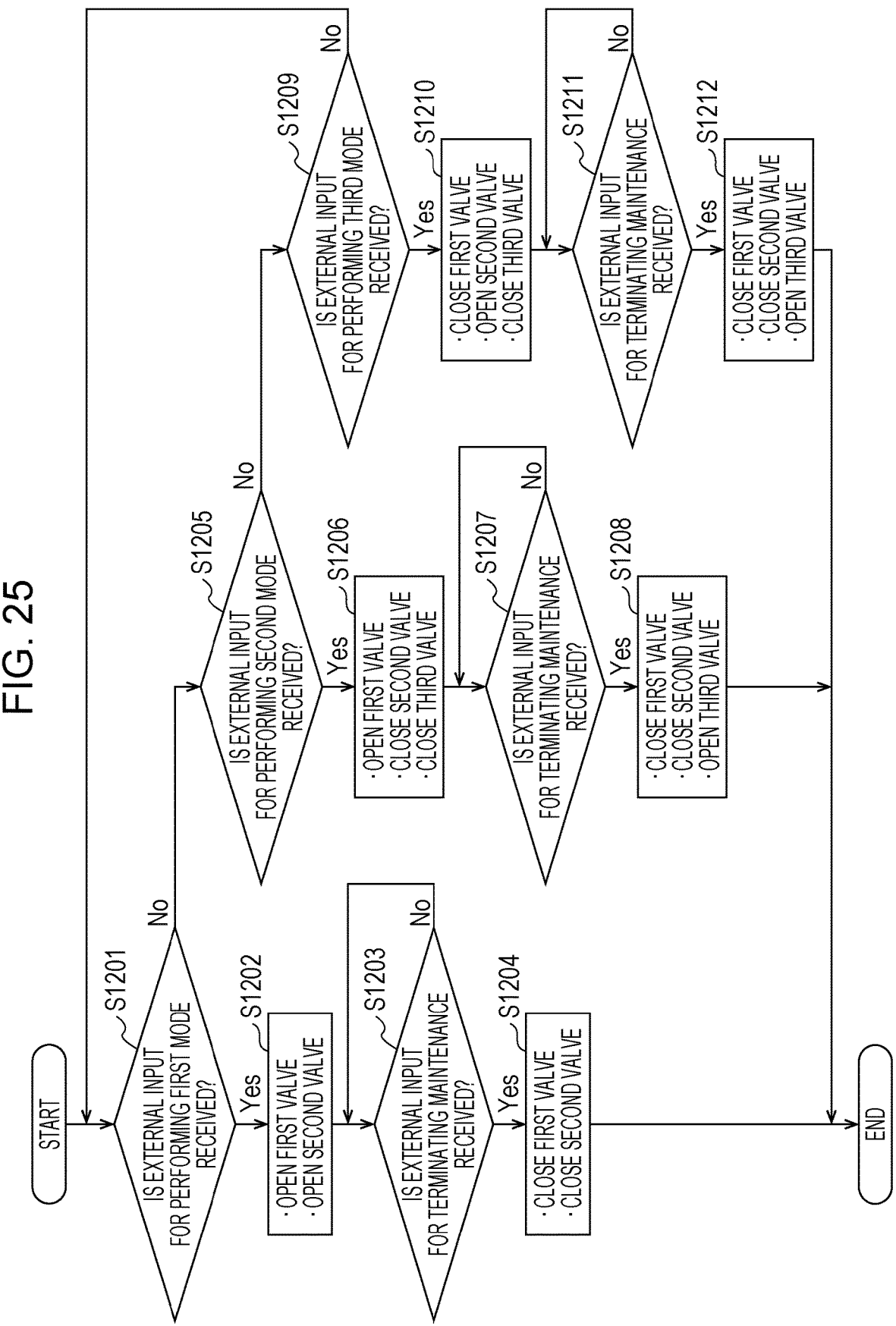
FIG. 25 is a flowchart illustrating an example of how a hydrogen system according to a fourteenth embodiment works.

FIG. 25 is a flowchart illustrating the example of how the hydrogen system according to the fourteenth embodiment works.

The following working may be performed by the reading of the control program by the arithmetic circuit of the controller 50 from the storage circuit of the controller 50. However, all the following working does not have to be performed by the controller 50, and an operator may perform part of the working.

Steps S1201, S1202, S1203, S1204, S1206, S1207 and S1208 in FIG. 25 are the same as steps S1001, S1002, S1003, S1004, S1006, S1007 and S1008 in FIG. 22, and detailed descriptions for them will be omitted.

While the hydrogen system 100 is in operation, the first valve 16 and the second valve 17 are closed and the third valve 20 is opened. While the hydrogen system 100 is in operation, the hydrogen-containing gas generated by the generator 11 is supplied to the storage 12 via the first gas passage 13, and is temporarily stored in the storage 12.

The hydrogen-containing gas stored in the storage 12 is supplied to the hydrogen-using apparatus via the hydrogen supplying passage at appropriate time. Thereby, the hydrogen-using apparatus uses hydrogen in the hydrogen-containing gas.

If in step S1205, the receiver 60 receives no external input for performing the second mode (if No in step S1205), the controller 50 proceeds to step S1209. In step S1209, it is determined whether the receiver 60 receives an external input for performing the third mode.

If the receiver 60 receives no external input for performing the third mode (if No in step S1209), the controller 50 returns to step S1201, and performs the determination operation of step S1201 at appropriate time.

If the receiver 60 receives the external input for performing the third mode (if Yes in step S1209), the second valve 17 is opened, the third valve 20 is closed, and the opened/closed state of the first valve 16 is kept in the closed state in step S1210. Thereby, the third mode is performed to disrupt the communication of the interior of the generator 11 with the outside of the housing 19 by the first valve 16 and the third valve 20, and to make the interior of the storage 12 communicate with the outside of the housing 19. This makes it possible to discharge the hydrogen-containing gas in the interior of the storage 12 to the outside of the housing 19 via the third gas passage 15.

Next, in step S1211, it is determined whether the receiver 60 receives the external input for terminating the maintenance.

If the receiver 60 receives no external input for terminating the maintenance (if No in step S1211), the state is kept as it is.

If the receiver 60 receives the external input for terminating the maintenance (if Yes in step S1211), the second valve 17 is closed, the third valve 20 is opened, and the opened/closed state of the first valve 16 is kept in the closed state in step S1212. Thereafter, the operation of the hydrogen system 100 may be resumed at appropriate time.

As discussed above, when the operator performs maintenance on either or both of the generator 11 and the storage 12, the hydrogen system 100 according to the fourteenth embodiment is capable of putting the interior of the generator 11 and/or the interior of the storage 12 into a state of being able to discharge hydrogen to the outside of the housing 19 by the controller 50 performing one of the first mode, the second mode and the third mode based on an input received by the receiver 60. This makes it possible for the operator to perform the maintenance on the generator 11 and/or the storage 12 without difficulty.

Specifically, when maintenance is performed on both the generator 11 and the storage 12, the first mode is performed to make the interior of the generator 11 and the interior of the storage 12 communicate with the outside of the housing 19. This makes it possible to discharge the hydrogen-containing gas in the interior of the generator 11 and the interior of the storage 12 to the outside of the housing 19.

When maintenance is performed on the generator 11, the second mode is performed to disrupt the communication of the interior of the storage 12 with the outside of the housing 19 by the second valve 17 and the third valve 20, and to make the interior of the generator 11 communicate with the outside of the housing 19. This makes it possible to discharge the hydrogen-containing gas in the interior of the generator 11 to the outside of the housing 19.

When maintenance is performed on the storage 12, the third mode is performed to disrupt the communication of the interior of the generator 11 with the outside of the housing 19 by the first valve 16 and the third valve 20, and to make the interior of the storage 12 communicate with the outside of the housing 19. This makes it possible to discharge the hydrogen-containing gas in the interior of the storage 12 to the outside of the housing 19.

The hydrogen system 100 according to the fourteenth embodiment may be the same as the hydrogen systems 100 according to any one of the first embodiment, the first to third examples of the first embodiment, the second embodiment, the example of the second embodiment, the third embodiment, the example of the third embodiment, the fourth embodiment, the example of the fourth embodiment, the fifth embodiment, the modification of the fifth embodiment, the sixth to ninth embodiments, the modification of the ninth embodiment, and the tenth to thirteenth embodiments, except for the above features.

Fifteenth Embodiment

A hydrogen system 100 according to a fifteenth embodiment is the same as the hydrogen system 100 according to the thirteenth embodiment, except for the following points involved in control by the controller 50.

The controller 50 operates the pressure booster 40 in the first mode of opening the first valve 16 and the second valve 17, and in the second mode of closing the second valve 17 and the third valve 20 and opening the first valve 16. The controller 50 does not operate the pressure booster 40 in the third mode of closing the first valve 16 and the third valve 20 and opening the second valve 17.

Detailed descriptions will be hereinafter provided for an example of how the hydrogen system 100 according to the fifteenth embodiment works.

Figure 26:
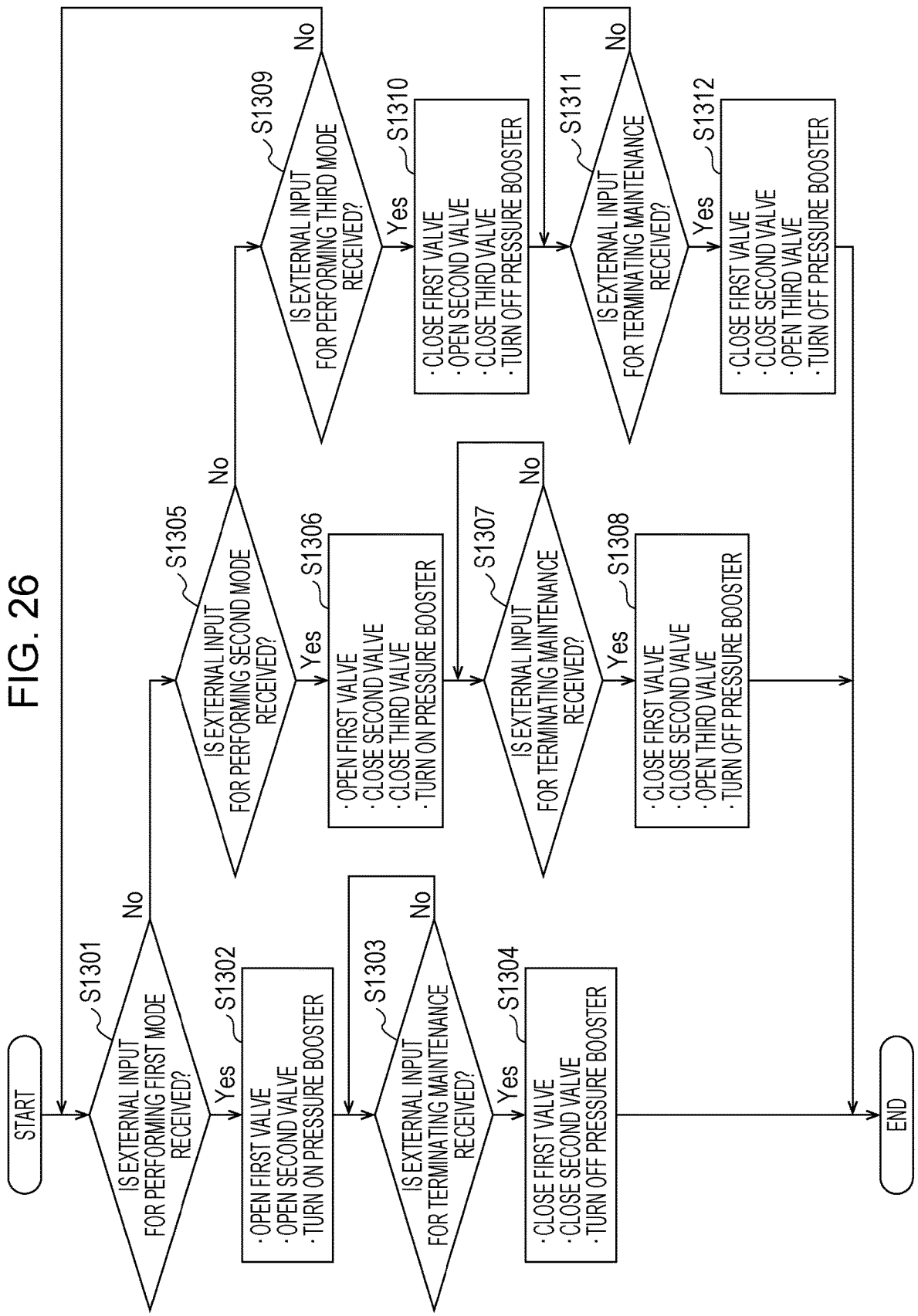
FIG. 26 is a flowchart illustrating an example of how a hydrogen system according to a fifteenth embodiment works.

FIG. 26 is a flowchart illustrating the example of how the hydrogen system according to the fifteenth embodiment works.

The following working may be performed by the reading of the control program by the arithmetic circuit of the controller 50 from the storage circuit of the controller 50. However, all the following working does not have to be performed by the controller 50, and an operator may perform part of the working.

Steps S1301, S1302, S1303, S1304, S1306, S1307 and S1308 in FIG. 26 are the same as steps S1101, S1102, S1103, S1104, S1106, S1107 and S1108 in FIG. 24, and detailed descriptions for them will be omitted.

While the hydrogen system 100 is in operation, the first valve 16 and the second valve 17 are closed and the third valve 20 is opened. While the hydrogen system 100 is in operation, the hydrogen-containing gas generated by the generator 11 is supplied to the storage 12 with the pressure of the hydrogen-containing gas boosted by the pressure booster 40. The high-pressure hydrogen-containing gas supplied to the storage 12 via the first gas passage 13 is temporarily stored in the storage 12.

The hydrogen-containing gas stored in the storage 12 is supplied to the hydrogen-using apparatus via the hydrogen supplying passage at appropriate time. Thereby, the hydrogen-using apparatus uses hydrogen in the hydrogen-containing gas.

If in step S1305, the receiver 60 receives no external input for performing the second mode (if No in step S1305), the controller 50 proceeds to step S1309. In step S1309, it is determined whether the receiver 60 receives the external input for performing the third mode.

If the receiver 60 receives no external input for performing the third mode (if No in step S1309), the controller 50 returns to step S1301, and performs the determination operation of step S1301 at appropriate time.

If the receiver 60 receives the external input for performing the third mode (if Yes in step S1309), the second valve 17 is opened, the third valve 20 is closed and the opened/closed state of the first valve 16 is kept in the closed state in step S1310. In addition, the pressure booster 40 is not operated (OFF) while the second valve 17 is opened and the first valve 16 and the third valve 20 are closed. In other words, the operation of the pressure booster 40 is stopped. Thereby, the third mode is performed to disrupt the communication of the interior of the generator 11 with the outside of the housing 19 by the first valve 16 and the third valve 20, and to make the interior of the storage 12 communicate with the outside of the housing 19. This makes it possible to discharge the hydrogen-containing gas in the interior of the storage 12 to the outside of the housing 19 via the third gas passage 15.

Next, in step S1311, it is determined whether the receiver 60 receives the external input for terminating the maintenance.

If the receiver 60 receives no external input for terminating the maintenance (if No in step S1311), the state is kept as it is.

If the receiver 60 receives the external input for terminating the maintenance (if Yes in step S1311), the second valve 17 is closed, the third valve 20 is opened, and the opened/closed state of the first valve 16 is kept in the closed state in step S1312. In addition, the operational state of the pressure booster 40 is kept in the OFF state. Thereafter, the operation of the hydrogen system 100 may be resumed at appropriate time.

As discussed above, the hydrogen system 100 according to the fifteenth embodiment is capable of appropriately discharging the hydrogen-containing gas in the interior of the generator 11 to the outside of the housing 19 through the pressure boosting operation of the pressure booster 40 in the first mode and in the second mode.

In many cases, the hydrogen-containing gas in high pressure state is stored in the storage 12. In these cases, in the third mode, by opening the second valve 17 with the first valve 16 and the third valve 20 kept in the closed state, the hydrogen system 100 according to the fifteenth embodiment is capable of appropriately discharging the hydrogen-containing gas in the interior of the storage 12 to the outside of the housing 19 using the gas pressure in the interior of the storage 12. Thus, in the third mode, the hydrogen system 100 according to the fifteenth embodiment is capable of reducing the amount of electric power needed to operate the pressure booster 40, by not operating the pressure booster 40. Furthermore, in the third mode, the hydrogen system 100 according to the fifteenth embodiment is capable of reducing a risk of damage to the pressure booster 40, provided among the generator 11, the first valve 16 and the third valve 20, by not operating the pressure booster 40 when closing the first valve 16 and the third valve 20.

The hydrogen system 100 according to the fourteenth embodiment may be the same as the hydrogen systems 100 according to any one of the first embodiment, the first to third examples of the first embodiment, the second embodiment, the example of the second embodiment, the third embodiment, the example of the third embodiment, the fourth embodiment, the example of the fourth embodiment, the fifth embodiment, the modification of the fifth embodiment, the sixth to ninth embodiments, the modification of the ninth embodiment, and the tenth to fourteenth embodiments, except for the above features.

The first embodiment, the first to third examples of the first embodiment, the second embodiment, the example of the second embodiment, the third embodiment, the example of the third embodiment, the fourth embodiment, the example of the fourth embodiment, the fifth embodiment, the modification of the fifth embodiment, the sixth to ninth embodiments, the modification of the ninth embodiment, and the tenth to fifteenth embodiments may be combined together as long as they do not reject each other.

From the above explanations, many improvements to the present disclosure and other embodiments will be obvious to those skilled in the art. For this reason, the above explanations shall be construed as being shown as examples, and are provided for the purpose of teaching the best modes for carrying out the present disclosure to those skilled in the art. The detailed structures and/or the detailed functions may be substantially modified without departing from the spirit of the present disclosure.

An aspect of the present disclosure is applicable to the hydrogen system which is capable of discharging the hydrogen-containing gas from the interior of the housing to the outside of the housing more appropriately than ever.

What is claimed is:

1. A hydrogen system comprising:
a generator which generates hydrogen-containing gas;
a storage which stores the hydrogen-containing gas generated by the generator;
a first gas passage which connects the generator and the storage;
a housing which houses the generator, the storage and the first gas passage;
a second gas passage in which the hydrogen-containing gas discharged from the first gas passage to an outside of the housing flows;
a first valve provided to the second gas passage;
a third gas passage in which the hydrogen-containing gas discharged from the storage to the outside of the housing flows;
a second valve provided to the third gas passage;
a fourth gas passage in which the hydrogen-containing gas discharged from the storage and supplied to a hydrogen-using apparatus flows;
at least one detector which detects hydrogen leakage inside the housing; and
a controller which includes a processor and a memory storing a program, and the program, when executed by the processor, causes the controller to open at least one of the first valve and the second valve to discharge the hydrogen-containing gas to the outside of the housing when the at least one detector detects the hydrogen leakage.

2. The hydrogen system according to claim 1, wherein the executed program causes the controller, when the at least one detector detects the hydrogen leakage, to first open the first valve out of the first valve and the second valve.

3. The hydrogen system according to claim 2, wherein the executed program causes the controller, if the at least one detector no longer detects the hydrogen leakage within a predetermined time length after the first valve is opened, not to open the second valve.

4. The hydrogen system according to claim 2, wherein the executed program causes the controller, if the at least one detector continues detecting the hydrogen leakage beyond a predetermined time length after the first valve is opened, to open the second valve.

5. The hydrogen system according to claim 1, wherein the executed program causes the controller to open both the first valve and the second valve.

6. The hydrogen system according to claim 1, wherein the executed program causes the controller, when the at least one detector detects the hydrogen leakage, to open both the first valve and the second valve.

7. The hydrogen system according to claim 1, wherein the executed program causes the controller to open the first valve, and to close the second valve.

8. The hydrogen system according to claim 1, wherein the executed program causes the controller, when the at least one detector detects the hydrogen leakage, to open the first valve, and to close the second valve.

9. The hydrogen system according to claim 1, wherein the executed program causes the controller to close the first valve, and to open the second valve.

10. The hydrogen system according to claim 1, wherein the executed program causes the controller, when the at least one detector detects the hydrogen leakage, to close the first valve, and to open the second valve.

11. The hydrogen system according to claim 1,
further comprising a third valve provided to the first gas passage downstream of a branch point of the first gas passage from which the second gas passage is branched, wherein
the executed program causes the controller to close the third valve while the controller opens the first valve.

12. The hydrogen system according to claim 11,
further comprising a fourth valve provided to the first gas passage upstream of the branch point from which the second gas passage is branched, wherein
the executed program causes the controller to close the third valve and to open the fourth valve while the controller opens the first valve.

13. The hydrogen system according to claim 1,
further comprising a third valve provided to the first gas passage downstream of a branch point of the first gas passage from which the second gas passage is branched, wherein
the executed program causes the controller to close the third valve while the controller opens the second valve.

14. The hydrogen system according to claim 1, further comprising:
a third valve provided to the first gas passage downstream of a branch point of the first gas passage from which the second gas passage is branched:
a fourth valve provided to the first gas passage upstream of the branch point from which the second gas passage is branched: and
a first joint and a second joint provided to the first gas passage between the third valve and the fourth valve, wherein
the second gas passage is branched from the first gas passage between the first joint and the second joint.

15. The hydrogen system according to claim 1, wherein:
the at least one detector includes
a first detector which detects hydrogen leakage from the first gas passage, and
a second detector which detects hydrogen leakage from the storage, and
the executed program causes the controller, if the first detector detects the hydrogen leakage but the second detector detects no hydrogen leakage, to open the first valve, and to close the second valve.

16. The hydrogen system according to claim 1, wherein:
the at least one detector includes
a first detector which detects hydrogen leakage from the first gas passage, and
a second detector which detects hydrogen leakage from the storage, and
the executed program causes the controller, if the second detector detects the hydrogen leakage but the first detector detects no hydrogen leakage, to open the second valve, and to close the first valve.

17. The hydrogen system according to claim 1, further comprising a ventilator which ventilates an interior of the housing,
wherein the executed program causes the controller, when the at least one detector detects hydrogen leakage, to operate the ventilator.

18. The hydrogen system according to claim 1, further comprising a ventilator which ventilates an interior of the housing,
wherein the executed program causes the controller, when the at least one detector detects hydrogen leakage, to stop generation of the hydrogen-containing gas by the generator, and to operate the ventilator.

19. The hydrogen system according to claim 1, further comprising:
a third valve provided to the first gas passage downstream of a branch point of the first gas passage from which the second gas passage is branched; and
a receiver which receives an input from an outside, wherein
the executed program causes the controller, based on the input received by the receiver, to perform one of
a first mode of opening the first valve and the second valve, or
a second mode of closing the second valve and the third valve, and opening the first valve.

20. The hydrogen system according to claim 1, further comprising:
a third valve provided to the first gas passage downstream of a branch point of the first gas passage from which the second gas passage is branched; and
a receiver which receives an input from an outside, wherein
the executed program causes the controller, based on the input received by the receiver to perform one of:
a first mode of opening the first valve and the second valve,
a second mode of closing the second valve and the third valve, and opening the first valve, or
a third mode of closing the first valve and the third valve, and opening the second valve.

21. A hydrogen system comprising:
a generator which generates hydrogen-containing gas;
a storage which stores the hydrogen-containing gas generated by the generator;
a first gas passage which connects the generator and the storage;
a housing which houses the generator, the storage and the first gas passage;
a second gas passage in which the hydrogen-containing gas discharged from the first gas passage to an outside of the housing flows;
a first valve provided to the second gas passage;
a third gas passage in which the hydrogen-containing gas discharged from the storage to the outside of the housing flows;
a second valve provided to the third gas passage;
a fourth gas passage in which the hydrogen-containing gas discharged from the storage and supplied to a hydrogen-using apparatus flows;
a third valve provided to the first gas passage downstream of a branch point of the first gas passage from which the second gas passage is branched;
a fourth valve provided to the first gas passage upstream of the branch point from which the second gas passage is branched; and
a controller which includes a processor and a memory storing a program, wherein:
the program, when executed by the processor, causes the controller to open at least one of the first valve and the second valve, and causes the controller to close both the third valve and the fourth valve while the controller opens the first valve.

22. The hydrogen system according to claim 21,
further comprising a pressure booster which boosts pressure of the hydrogen-containing gas generated by the generator and supplies the hydrogen-containing gas to the storage, wherein
the second gas passage is branched from the first gas passage downstream of the pressure booster, and
the executed program causes the controller not to operate the pressure booster while the controller opens the first valve and to close the third valve and the fourth valve.

23. A hydrogen system comprising:
a generator which generates hydrogen-containing gas;
a storage which stores the hydrogen-containing gas generated by the generator;
a first gas passage which connects the generator and the storage;
a housing which houses the generator, the storage and the first gas passage;

a second gas passage in which the hydrogen-containing gas discharged from the first gas passage to an outside of the housing flows;

a first valve provided to the second gas passage;

a third gas passage in which the hydrogen-containing gas discharged from the storage to the outside of the housing flows;

a second valve provided to the third gas passage;

a fourth gas passage in which the hydrogen-containing gas discharged from the storage and supplied to a hydrogen-using apparatus flows;

a pressure booster which boosts pressure of the hydrogen-containing gas generated by the generator and supplies the hydrogen-containing gas to the storage; and a controller which includes a processor and a memory storing a program, wherein:

the program, when executed by the processor, causes the controller to open at least one of the first valve and the second valve, and the second gas passage is branched from the first gas passage downstream of the pressure booster.

24. The hydrogen system according to claim 23, wherein the executed program causes the controller to operate the pressure booster while the controller opens the first valve.

25. The hydrogen system according to claim 23, further comprising:

a third valve provided to the first gas passage downstream of a branch point of the first gas passage from which the second gas passage is branched;

a receiver which receives an input from an outside; and a pressure booster which boosts pressure of the hydrogen-containing gas generated by the generator and supplies the hydrogen-containing gas to the storage, wherein the executed program causes the controller, based on the input received by the receiver, to perform one of
a first mode of opening the first valve and the second valve, or
a second mode of closing the second valve and the third valve, and opening the first valve, the second gas passage is branched from the first gas passage downstream of the pressure booster, and the executed program causes the controller to operate the pressure booster in the first mode and the second mode.

26. The hydrogen system according to claim 23, further comprising:

a third valve provided to the first gas passage downstream of a branch point of the first gas passage from which the second gas passage is branched;

a receiver which receives an input from an outside; and a pressure booster which boosts pressure of the hydrogen-containing gas generated by the generator and supplies the hydrogen-containing gas to the storage, wherein:

the executed program causes the controller, based on the input received by the receiver to perform one of:
a first mode of opening the first valve and the second valve,
a second mode of closing the second valve and the third valve, and opening the first valve, or
a third mode of closing the first valve and the third valve, and opening the second valve, the second gas passage is branched from the first gas passage downstream of the pressure booster, and the executed program causes the controller to operate the pressure booster in the first mode and the second mode, and not to operate the pressure booster in the third mode.

* * * * *